US009800407B2

(12) United States Patent
Ansari et al.

(10) Patent No.: US 9,800,407 B2
(45) Date of Patent: Oct. 24, 2017

(54) METHODS AND APPARATUSES FOR PRIME NUMBER GENERATION AND STORAGE

(71) Applicant: QUALCOMM Incorporated, San Diego, CA (US)

(72) Inventors: Bijan Ansari, San Diego, CA (US); Lu Xiao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 338 days.

(21) Appl. No.: 14/014,962

(22) Filed: Aug. 30, 2013

(65) Prior Publication Data

US 2015/0063565 A1 Mar. 5, 2015

(51) Int. Cl.
  *H04L 9/00* (2006.01)
  *H04L 9/08* (2006.01)
  *G06F 12/14* (2006.01)
  *H04L 9/30* (2006.01)

(52) U.S. Cl.
  CPC ........ *H04L 9/0869* (2013.01); *G06F 12/1408* (2013.01); *H04L 9/3033* (2013.01)

(58) Field of Classification Search
  CPC .. H04L 9/3033; H04L 9/0869; G06F 12/1408
  USPC .............................................. 388/44; 380/44
  See application file for complete search history.

(56) References Cited

U.S. PATENT DOCUMENTS

| | | | |
|---|---|---|---|
| 5,850,450 A * | 12/1998 | Schweitzer et al. | 380/30 |
| 6,307,938 B1 * | 10/2001 | Matyas et al. | 380/44 |
| 6,345,098 B1 * | 2/2002 | Matyas, Jr. | H04L 9/3033 380/46 |
| 7,149,763 B2 * | 12/2006 | Joye et al. | 708/250 |
| 8,111,826 B2 * | 2/2012 | Takashima | 380/28 |
| 8,290,150 B2 * | 10/2012 | Erhart et al. | 380/44 |
| 8,488,780 B2 * | 7/2013 | Takahashi et al. | 380/28 |
| 2002/0186837 A1 | 12/2002 | Hopkins et al. | |
| 2008/0123842 A1 * | 5/2008 | Pohja | H04L 9/302 380/44 |
| 2008/0279373 A1 * | 11/2008 | Erhart et al. | 380/46 |
| 2008/0310634 A1 | 12/2008 | Pavlovic | |

(Continued)

FOREIGN PATENT DOCUMENTS

| | | |
|---|---|---|
| JP | 2001154580 A | 6/2001 |
| JP | 2013029618 A | 2/2013 |

OTHER PUBLICATIONS

International Search Report and Written Opinion—PCT/US2014/052877—ISA/EPO—May 12, 2015.

*Primary Examiner* — Monjour Rahim
(74) *Attorney, Agent, or Firm* — Loza & Loza LLP

(57) ABSTRACT

One feature pertains to a method for generating a prime number by repeatedly generating a random number seed S having k bits, generating a random number R having n bits based on the seed S, where k is less than n, and determining whether the random number R is prime. The steps are repeated until it is determined that the random number R generated is prime, upon which the random number seed S used to generate the random number R is stored in a memory circuit. Later, the stored random number seed S may be retrieved from the memory circuit, and the prime number is regenerated based on the random number seed S. In one example, the random number R generated is further based on a secret key $k_S$ that may be stored in a secure memory circuit.

34 Claims, 14 Drawing Sheets

(56) References Cited

U.S. PATENT DOCUMENTS

2010/0063932 A1* 3/2010 Camenisch et al. ............ 705/76
2010/0329455 A1* 12/2010 Nemiroff ........................ 380/46
2013/0051552 A1* 2/2013 Handschuh et al. ............ 380/44

* cited by examiner

METHODS AND APPARATUSES FOR PRIME NUMBER GENERATION AND STORAGE

BACKGROUND

Field

Various features relate to cryptography, and more particularly to methods and apparatuses for the generation and efficient storage of prime numbers.

Background

Many cryptographic security algorithms, such as the Rivest Shamir Adleman (RSA) algorithm, utilize cryptographic keys to operate. Such keys are typically generated using key generation processes that may require relatively large (e.g., 512 bit, 1,024 bit, etc.) prime numbers. However, prime number generation is a slow process and the processing time associated with prime number generation typically acts as a bottle neck in key generation processes. The processing time required is proportional to the cube of the bit length of the key to be generated by the key generation process. For example, generating 2,048 bit and 3,072 bit cryptographic keys may be 8 and 27 times slower, respectively, than generating a 1,024 bit key. In mobile device applications where power and speed constraints are pertinent, such increases in power consumption and processing time are deleterious.

According to some applications, cryptographic keys may be generated "offline" in that they are generated before they are actually needed by an application. The cryptographic keys or the prime numbers used to generate the cryptographic keys generated in such an offline manner are typically stored in memory and then delivered to application(s) on demand. In that case, the bottle neck in processing time associated with key generation described above is virtually eliminated. However, one outstanding issue with such offline key generation schemes is that the keys and/or the prime numbers used to generate the keys may be relatively large (e.g., more than 1,024 bits) and the necessary memory circuits required to store such large keys and/or prime numbers may not always be readily available. To compound the problem, regular data compression techniques are not very applicable in these cases because cryptographic keys and prime numbers have high entropy and cannot be compressed efficiently with conventional compression algorithms.

Thus, there is a need for new methods and apparatuses that aid in prime number generation and storage in order to minimize the amount of memory required to store large prime numbers for use in cryptographic security algorithms, such as RSA.

SUMMARY

One feature provides a method for generating and storing seed values for prime number generation. The method comprises generating a prime number by repeatedly generating a random number seed S having k bits, generating a random number R having n bits based on the seed S, where k is less than n, and determining whether the random number R is prime, until it is determined that the random number R generated is prime. The random number seed S used to generate the random number R determined to be prime is stored in a memory circuit. According to one aspect, the method further comprises retrieving the stored random number seed S from the memory circuit, and regenerating the prime number based on the random number seed S. According to another aspect, the method further comprises generating a cryptographic key based on the prime number.

According to one aspect, the method further comprises deleting the random number R from a memory circuit after storing the seed S. According to another aspect, generating the random number R is further based on a secret key $k_S$. According to yet another aspect, the method further comprises storing the secret key $k_S$ used to generate the random number R determined to be prime in a secure memory circuit.

According to one aspect, the random number seed S is stored prior to receiving a request for one or more prime numbers from a cryptographic key generation process. According to another aspect, generating the random number R based on the seed S includes executing a one way function $f$ that receives the seed S as an input and generates the random number R as an output, and the one way function $f$ is at least one of a secure hash function and/or a block cipher.

Another feature provides an apparatus for generating and storing seed values for prime number generation where the apparatus comprises a memory circuit, and a processing circuit communicatively coupled to the memory circuit, the processing circuit configured to generate a prime number by repeatedly generating a random number seed S having k bits, generating a random number R having n bits based on the seed S, where k is less than n, and determining whether the random number R is prime, until it is determined that the random number R generated is prime, and store the random number seed S used to generate the random number R determined to be prime in the memory circuit. According to one aspect, the processing circuit is further configured to retrieve the stored random number seed S from the memory circuit, and regenerate the prime number based on the random number seed S. According to another aspect, the processing circuit is further configured to generate a cryptographic key based on the prime number. According to yet another aspect, the random number seed S is stored prior to receiving a request for one or more prime numbers from a cryptographic key generation process. According to another aspect, generating the random number R determined to be prime is further based on a secret key $k_S$, and the processing circuit is further configured to store the secret key $k_S$ in a secure memory circuit.

Another feature provides an apparatus for generating and storing seed values for prime number generation where the apparatus comprises means for generating a prime number by repeatedly generating a random number seed S having k bits, generating a random number R having n bits based on the seed S, where k is less than n, and determining whether the random number R is prime, until it is determined that the random number R generated is prime, and means for storing the random number seed S used to generate the random number R determined to be prime in the memory circuit. According to one aspect, the apparatus further comprises means for retrieving the stored random number seed S from the memory circuit, and means for regenerating the prime number based on the random number seed S. According to another aspect, generating the random number R determined to be prime is further based on a secret key $k_S$, and the apparatus further comprises means for storing the secret key $k_S$ in a secure memory circuit.

Another feature provides a computer-readable storage medium having one or more instructions stored thereon, which when executed by at least one processor causes the processor to generate a prime number by repeatedly generating a random number seed S having k bits, generating a random number R having n bits based on the seed S, where k is less than n, and determining whether the random number R is prime, until it is determined that the random number R generated is prime, and store the random number seed S used to generate the random number R determined to be prime in the memory circuit. According to one aspect, the instructions further cause the processor to retrieve the stored random number seed S from the memory circuit, and regenerate the prime number based on the random number seed S.

Another feature provides a method for generating and storing seed values for prime number generation that comprises generating a random number seed S having k bits and a plurality of supplemental seeds $T_i$ each having g bits, generating a plurality of second seeds $S_i$ that are each based on a different supplemental seed of the plurality of supplemental seeds $T_i$ and the random number seed S, generating a plurality of random numbers $R_i$ each having n bits where n is less than k+g, and each of the plurality of random numbers $R_i$ is based on a different second seed of the plurality of second seeds $S_i$, determining that at least one random number $R_P$ of the plurality of random numbers $R_i$ is prime, the random number $R_P$ based on a second seed $S_P$ of the plurality of second seeds $S_i$, the second seed $S_P$ based on a supplemental seed $T_P$ of the plurality of supplemental seeds $T_i$ and the random number seed S, and storing the random number seed S and the supplemental seed $T_P$ in a memory circuit. According to one aspect, the plurality of random numbers $R_i$ is further based on a secret key $k_S$, and the method further comprises storing the secret key $k_S$ in a secure memory circuit. According to another aspect, the method further comprises retrieving the stored random number seed S and the supplemental seed $T_P$ from the memory circuit, and regenerating the prime random number $R_P$ based on the random number seed S and the supplemental seed $T_P$. According to yet another aspect, the random number seed S and the supplemental seed $T_P$ is stored prior to receiving a request for one or more prime numbers from a cryptographic key generation process, and the method further comprises receiving the request for one or more prime numbers from the cryptographic key generation process, generating a cryptographic key based on the prime random number $R_P$, and providing the cryptographic key to the cryptographic key generation process.

According to one aspect, generating the plurality of random numbers $R_i$ based on the different second seeds of the plurality of second seeds $S_i$ includes executing a one way function $f$ that receives each of the plurality of second seeds $S_i$ as inputs and generates the plurality of random numbers $R_i$ as outputs, and the one way function $f$ is at least one of a secure hash function and/or a block cipher. According to another aspect, the method further comprises determining that at least one random number of the plurality of random numbers $R_i$ is not prime, generating another supplemental seed $T_2$ having g bits, generating another second seed $S_2$ based on the supplemental seed $T_2$ and the random number seed S, generating another random number $R_2$ having n bits, the random number $R_2$ based on the second seed $S_2$, determining that the random number $R_2$ is prime, and storing the supplemental seed $T_2$ in the memory circuit. According to yet another aspect, the method further comprises retrieving the stored random number seed S and the supplemental seed $T_2$ from the memory circuit, and regenerating the prime random number $R_2$ based on the random number seed S and the supplemental seed $T_2$. According to another aspect, the method further comprises receiving a request for a predetermined number of prime numbers, and repeating the method steps of generating another supplemental seed $T_2$, generating another second seed $S_2$ based on the supplemental seed $T_2$ and the random number seed S, generating another random number $R_2$ having n bits, the random number $R_2$ based on the second seed $S_2$, determining that the random number $R_2$ is prime, and storing the supplemental seed $T_2$ in the memory circuit, until a number of supplemental seeds each associated with different prime numbers have been stored equal to the predetermined number.

Another feature provides an apparatus for generating and storing seed values for prime number generation where the apparatus comprises a memory circuit, and a processing circuit communicatively coupled to the memory circuit, the processing circuit configured to generate a random number seed S having k bits and a plurality of supplemental seeds $T_i$ each having g bits, generate a plurality of second seeds $S_i$ that are each based on a different supplemental seed of the plurality of supplemental seeds $T_i$ and the random number seed S, generate a plurality of random numbers $R_i$ each having n bits where n is less than k+g, and each of the plurality of random numbers $R_i$ is based on a different second seed of the plurality of second seeds $S_i$, determine that at least one random number $R_P$ of the plurality of random numbers $R_i$ is prime, the random number $R_P$ based on a second seed $S_P$ of the plurality of second seeds $S_i$, the second seed $S_P$ based on a supplemental seed $T_P$ of the plurality of supplemental seeds $T_i$ and the random number seed S, and store the random number seed S and the supplemental seed $T_P$ in the memory circuit. According to one aspect, the plurality of random numbers $R_i$ is further based on a secret key $k_S$, and the processing circuit is further configured to store the secret key $k_S$ in a secure memory circuit. According to another aspect, the processing circuit is further configured to retrieve the stored random number seed S and the supplemental seed $T_P$ from the memory circuit, and regenerate the prime random number $R_P$ based on the random number seed S and the supplemental seed $T_P$. According to yet another aspect, the random number seed S and the supplemental seed $T_P$ is stored prior to receiving a request for one or more prime numbers from a cryptographic key generation process, and the processing circuit is further configured to receive the request for one or more prime numbers from the cryptographic key generation process, generate a cryptographic key based on the prime random number $R_P$, and provide the cryptographic key to the cryptographic key generation process.

According to one aspect, generating the plurality of random numbers $R_i$ based on the different second seeds of the plurality of second seeds $S_i$ includes the processing circuit further configured to execute a one way function $f$ that receives each of the plurality of second seeds $S_i$ as inputs and generates the plurality of random numbers $R_i$ as outputs, and the one way function $f$ is at least one of a secure hash function and/or a block cipher. According to another aspect, the processing circuit is further configured to determine that at least one random number of the plurality of random numbers $R_i$ is not prime, generate another supplemental seed $T_2$ having g bits, generate another second seed $S_2$ based on the supplemental seed $T_2$ and the random number seed S, generate another random number $R_2$ having n bits, the random number $R_2$ based on the second seed $S_2$, determine that the random number $R_2$ is prime, and store the supplemental seed $T_2$ in the memory circuit. According to yet another aspect, the processing circuit is further configured to retrieve the stored random number seed S and the supplemental seed $T_2$ from the memory circuit, and regenerate the prime random number $R_2$ based on the random number seed S and the supplemental seed $T_2$.

Another feature provides an apparatus for generating and storing seed values for prime number generation where the apparatus comprises means for generating a random number seed S having k bits and a plurality of supplemental seeds $T_i$ each having g bits, means for generating a plurality of second seeds $S_i$ that are each based on a different supplemental seed of the plurality of supplemental seeds $T_i$ and the random number seed S, means for generating a plurality of random numbers $R_i$ each having n bits where n is less than k+g, and each of the plurality of random numbers $R_i$ is based on a different second seed of the plurality of second seeds $S_i$, means for determining that at least one random number $R_P$ of the plurality of random numbers $R_i$ is prime, the random number $R_P$ based on a second seed $S_P$ of the plurality of second seeds $S_i$, the second seed $S_P$ based on a supplemental seed $T_P$ of the plurality of supplemental seeds $T_i$ and the random number seed S, and means for storing the random number seed S and the supplemental seed $T_P$ in a memory circuit. According to one aspect, the apparatus further comprises means for retrieving the stored random number seed S and the supplemental seed $T_P$ from the memory circuit, and means for regenerating the prime random number $R_P$ based on the random number seed S and the supplemental seed $T_P$.

Another feature provides a computer-readable storage medium having one or more instructions stored thereon, which when executed by at least one processor causes the processor to generate a random number seed S having k bits and a plurality of supplemental seeds $T_i$ each having g bits, generate a plurality of second seeds $S_i$ that are each based on a different supplemental seed of the plurality of supplemental seeds $T_i$ and the random number seed S, generate a plurality of random numbers $R_i$ each having n bits where n is less than k+g, and each of the plurality of random numbers $R_i$ is based on a different second seed of the plurality of second seeds $S_i$, determine that at least one random number $R_P$ of the plurality of random numbers $R_i$ is prime, the random number $R_P$ based on a second seed $S_P$ of the plurality of second seeds $S_i$, the second seed $S_P$ based on a supplemental seed $T_P$ of the plurality of supplemental seeds $T_i$ and the random number seed S, and store the random number seed S and the supplemental seed $T_P$ in a memory circuit. According to one aspect, the instructions further cause the processor to retrieve the stored random number seed S and the supplemental seed $T_P$ from the memory circuit, and regenerate the prime random number $R_P$ based on the random number seed S and the supplemental seed $T_P$.

DETAILED DESCRIPTION

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. As used herein, "primality tests" and "composite number tests" may be used interchangeably and are generally referred to as "primality tests." For example, tests such as the Miller-Rabin test may prove that a number is composite. By doing so the test also proves that the number is not prime. Thus, as used herein, executing a primality test on a number include those tests that prove or attempt to prove that a number is composite. As used herein, a "random number" may be truly random (e.g., it was generated by a true random number generator (RNG)) or it may be pseudo random (e.g., it was generated using a pseudo random number generator (PRNG)).

Overview

Methods and devices are described herein that reduce the amount of memory circuit storage space required to store values, such as seed values used to generate prime numbers, which may in turn be used to generate cryptographic keys for security algorithms. Specifically, one or more relatively small bit number seed values are pre-computed and stored instead of relatively large bit number prime numbers. The seeds values may be used at a later point in time to generate the prime numbers on demand. Such methods and devices are particularly useful for mobile devices having crypto-accelerator hardware modules where storage space is limited. Other devices may also benefit from the methods and apparatuses described herein to lower cryptographic key provisioning costs.

Figure 1:
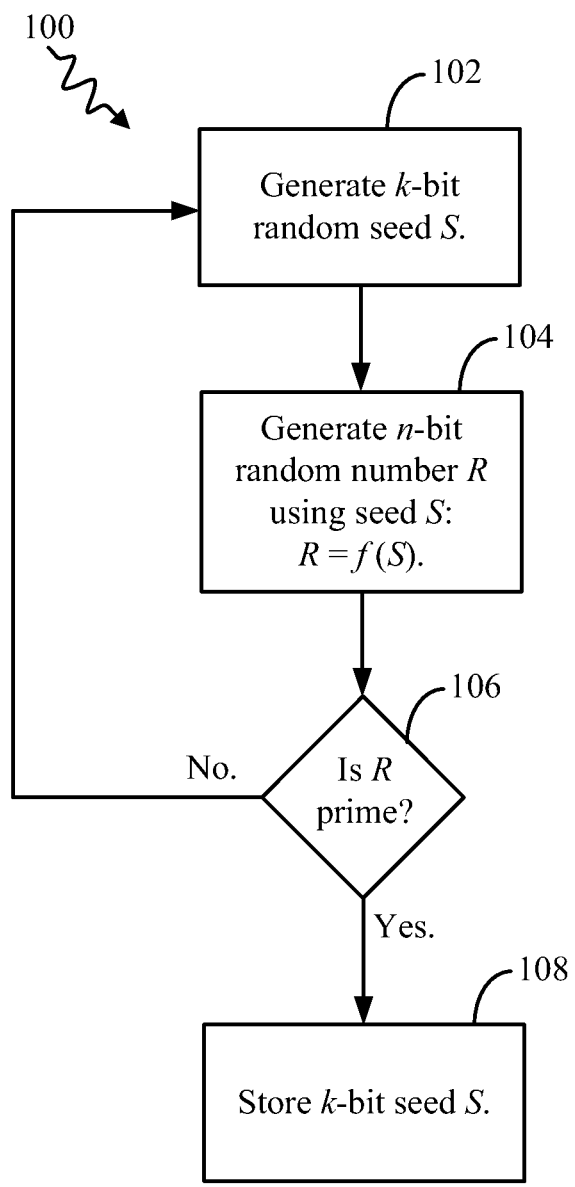
FIG. 1 illustrates a first example of a flow diagram of a method for generating and storing seed values for prime number generation.

Exemplary Methods for the Generation and Storage of Seed Values Used for Prime Number Generation FIG. 1 illustrates a flow diagram 100 of a method for generating and storing seed values for prime number generation according to one aspect. First, a k-bit random number seed S is generated 102. The random number seed S may be generated using, for example, a random or pseudorandom number generator. The value k may be any integer number greater than or equal to two. The random number seed S may then be used to generate an n-bit random number R where n>k 104. Specifically, a one-way function $f$ may be executed to generate the random number R based on the random number seed S according to the equation (1):

$$R = f(S) \qquad (1).$$

According to one example, the function f may be a cryptographic hash function, such as a secure hash function (e.g., SHA-1, SHA-2, etc.) or a block cipher such as advanced encryption standard (AES) with a secret key.

Next, a primality test is performed to determine whether the random number R is prime 106. As just one example the primality text performed may include the Miller-Rabin primality test. If the random number R is determined to be prime then the random number seed S is stored in memory 108. Otherwise, the method steps 102, 104, 106 are repeated such that a new random number seed S is generated 102, a new random number R is generated based on the random number seed S 104 (e.g., using function f), and a primality test is executed to determine whether the newly generated random number R is prime 106. These steps 102, 104, 106 are continuously repeated until a random number R is determined to be prime, after which the random number seed S that generated the random number R is stored 108. According to one example, subsequent iterations of the random number seed S may use k bits of the previously generated random number R, which was determined not to be prime. For instance, a subsequent iteration of the random number seed S may be equal to the first k bits of the random number R from the prior iteration.

Since the number of bits k of the random number seed S is less than the number of bits n of the prime random number R, memory space is saved by storing the seed S instead of the random number R, the latter of which may be discarded/deleted. Later, the random number seed S may be retrieved (e.g., from a memory circuit where it is stored) and used to regenerate the prime random number R using the one way function f. For example, a key generation process may request one or more prime numbers, which may be supplied using the method 100 described above. According to just one example, the keys generated thereby may be used by a cryptographic security algorithm, such as RSA.

Thus, according to the method illustrated in FIG. 1, a prime, random number R may be generated and then used with a key generation algorithm, such as RSA, to generate a cryptographic security key. The method illustrated in FIG. 1 may be performed "offline" in that the random number seed S known to generate a prime random number R is generated and stored prior to receiving a request for a prime number from a cryptographic security algorithm (e.g., RSA algorithm requesting prime number(s) to generate keys).

Figure 2:
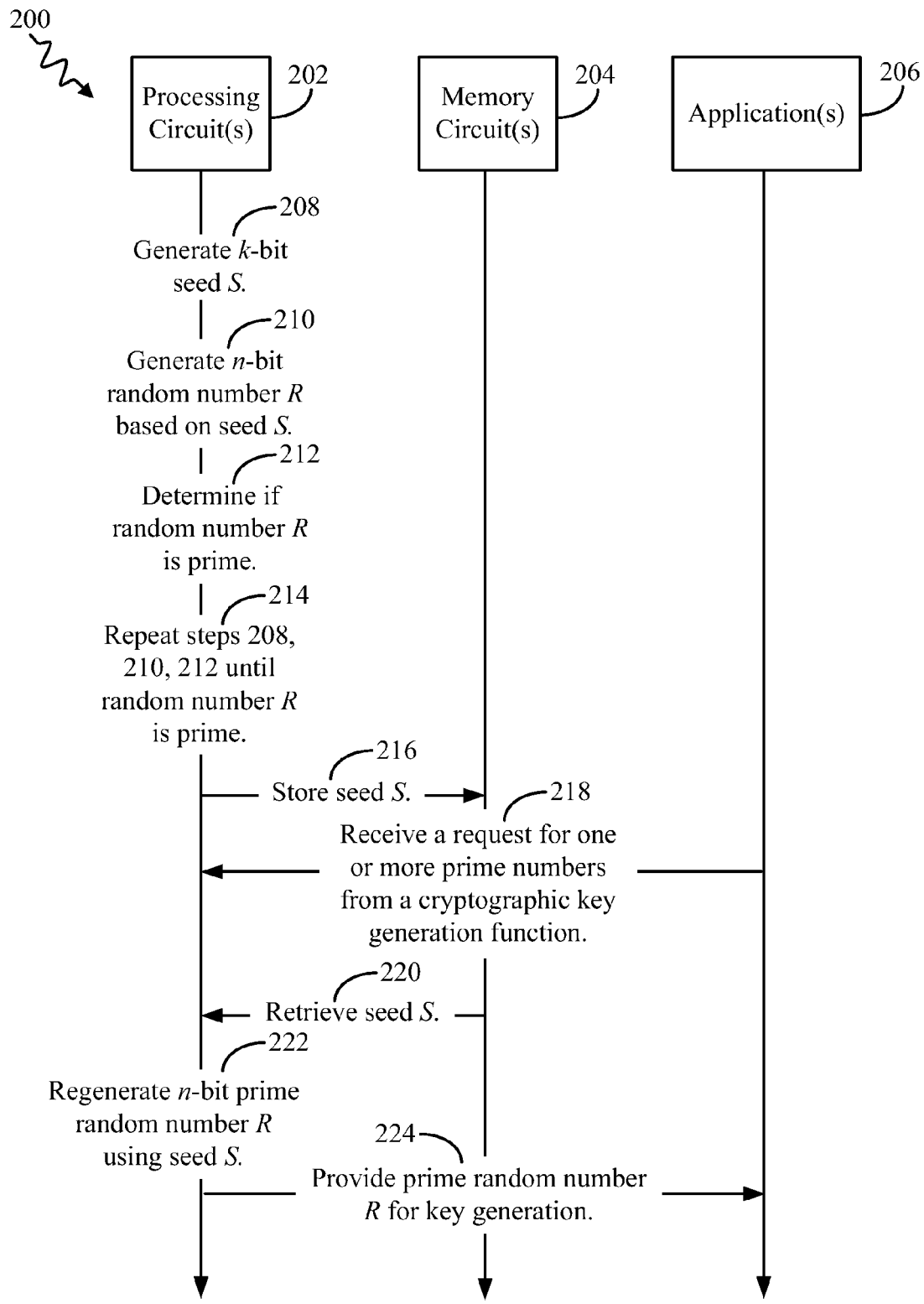
FIG. 2 illustrates a second example of a flow diagram of a method for generating and storing seed values for prime number generation.

FIG. 2 illustrates a flow diagram 200 of a method for generating and storing seed values for prime number generation according to one aspect. First, a k-bit random number seed S is generated at a processing circuit 202 (e.g., processor) 208. (Note that according to one aspect, the steps performed by the processing circuit 202 may be implemented in software.) Then, an n-bit random number R is generated based on the seed S (e.g., using the function f described above with respect to FIG. 1) 210. Next, it is determined whether the random number R generated is prime 212. Steps 208, 210, 212 are repeated until at least one random number R is determined to be prime 214. Then, once a random number R is determined to be prime, the seed S used to generate the prime random number R is stored at a memory circuit 204 (e.g., memory) 216. The prime random number R may be discarded or deleted at this point since the seed S has been stored. Next, a request for one or more prime numbers is received from an application 206 that implements a cryptographic security algorithm (e.g., RSA) 218. In response to the request, the seed S is retrieved from memory 220, and the n-bit prime random number R is regenerated using the seed S 222. Finally, the prime random number R is transmitted/provided to the application requesting the prime number(s) for key generation 224.

Figure 3:
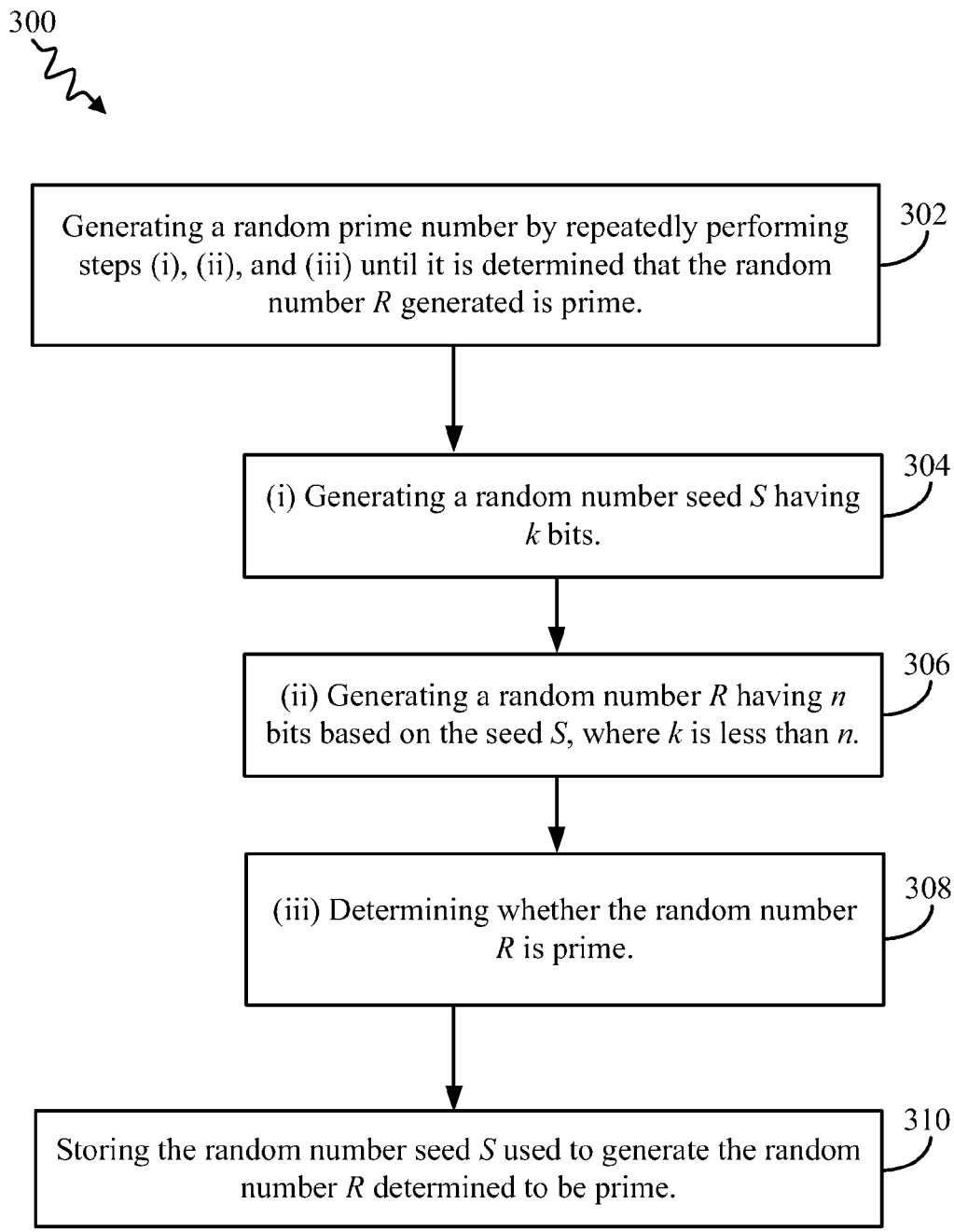
FIG. 3 illustrates a first example of a flow chart of a method for generating and storing seed values for prime number generation.

FIG. 3 illustrates a flow chart 300 of a method for generating and storing seed values for prime number generation according to one aspect. First, a random prime number is generated by repeatedly 302 generating a random number seed S having k bits 304, generating a random number R having n bits based on the seed S, where k is less than n 306, and determining whether the random number R is prime 308, until it is determined that the random number R generated is prime. Next, the random number seed S used to generate the random number R determined to be prime is stored 310.

Figure 4:
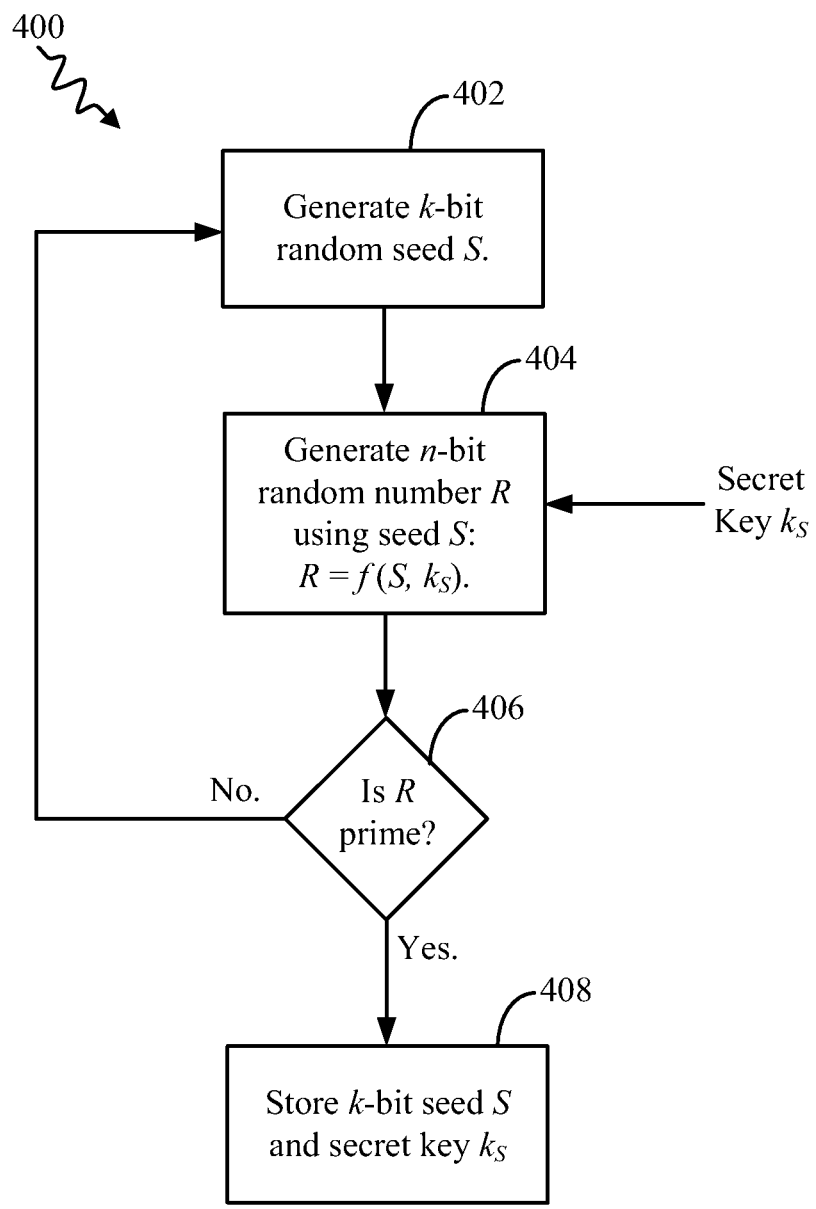
FIG. 4 illustrates a third example of a flow diagram of a method for generating and storing seed values for prime number generation.

FIG. 4 illustrates a flow diagram 400 of a method for generating and storing seed values for prime number generation according to one aspect. First, a k-bit random number seed S is generated 402. The random number seed S may be generated using, for example, a random or pseudorandom number generator. The value k may be any integer number greater than or equal to two. Then, the random number seed S along with a secret key $k_S$ may be used to generate an n-bit random number R where n>k 404. Specifically, a one way function f may be executed to generate the random number R based on the random number seed S and the secret key $k_S$ according to the equation (2):

$$R=f(S,k_S) \quad (2).$$

In one example, the secret key $k_S$ may be known only to the apparatus performing the method 400. According to one aspect, the secret key $k_S$ may be retrieved from secure memory (e.g., read only memory, one-time programmable (OTP) memory, that may or may not be encrypted) at the apparatus performing the method 400. In such a case the secret key $k_S$ may be stored ahead of time in the secure memory to prevent unauthorized access/discovery of the key $k_S$. According to another aspect, the secret key $k_S$ may not necessarily be stored at the apparatus in secure memory and is instead generated at the apparatus on the fly.

According to one example, the one way function f may be a cryptographic message authentication code (MAC), such as a hash-based message authentication code (HMAC), or a block cipher such as advanced encryption standard (AES). In both cases the MAC or the block cipher use the secret key $k_S$.

Next, a primality test is performed to determine whether the random number R is prime 406. If the random number R is determined to be prime then the random number seed S is stored in memory 408. Optionally, in cases where the secret key $k_S$ is not already stored in secure memory (e.g., it is generated as described above) the secret key $k_S$ is then stored in memory after it is determined that the random number R is prime. If the random number R is determined not to be prime then the method steps 402, 404, 406 are repeated such that a new random number seed S is generated 402, a new random number R is generated based on the random number seed S and the secret key $k_S$ 404 (e.g., using function f), and a primality test is executed to determine whether the newly generated random number R is prime 406. These steps 402, 404, 406 are continuously repeated until a random number R is determined to be prime, after which the random number seed S and the secret key $k_S$ that generated the random number R are stored 408. According to one example, the secret key $k_S$ is stored securely (e.g., in encrypted, OTP memory), and according to another example it stored in standard memory (e.g., ordinary random access memory (RAM)).

The random number seed S and the secret key $k_S$ may be later retrieved at a future point in time and used to regenerate the prime random number R using the function $f$. For example, a key generation process may request one or more prime numbers, which may be supplied using the method 400 described above. According to just one example, the keys generated thereby may be used by a cryptographic security algorithm, such as RSA.

Thus, according to the method illustrated in FIG. 4, a prime, random number R may be generated, which in turn is used to generate a cryptographic security key for a cryptographic security algorithm, such as RSA. The method illustrated in FIG. 4 may be performed "offline" in that the random number seed S and the secret key $k_S$ known to generate a prime random number R are generated and stored prior to receiving a request for a prime number from a key generation process.

Figure 5:
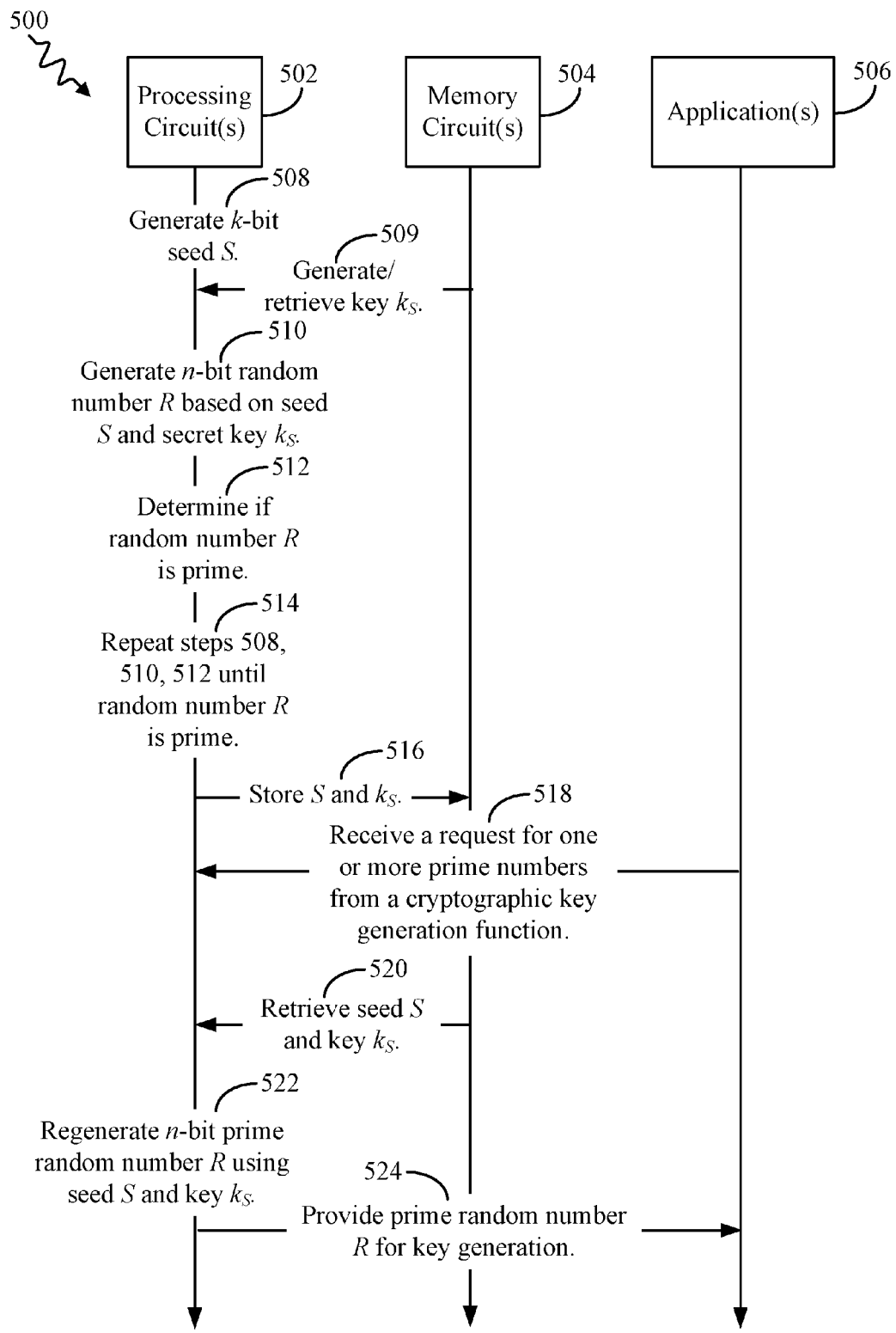
FIG. 5 illustrates a fourth example of a flow diagram of a method for generating and storing seed values for prime number generation.

FIG. 5 illustrates a flow diagram 500 of a method for generating and storing seed values for prime number generation according to one aspect. First, a k-bit random number seed S is generated at a processing circuit 502 (e.g., processor) 508. (Note that according to one aspect, the steps performed by the processing circuit 502 may be implemented in software.) Then, a secret key $k_S$ is generated or retrieved from secure memory of a memory circuit 504 (e.g., memory) 509, and an n-bit random number R is generated based on the seed S and the secret key $k_S$ (e.g., using the function $f$ described above with respect to FIG. 4) 510. Next, it is determined whether the random number R generated is prime 512. Steps 508, 509, 510, 512 are repeated until at least one random number R is determined to be prime 514. Then, once a random number R is determined to be prime, the seed S used to generate the prime random number R is stored at a memory circuit (e.g., standard memory such as RAM) 516. The prime random number R may be discarded or deleted at this point since the seed S has been stored. Next, a request for one or more prime numbers is received from an application 506 that implements a cryptographic key generation function/process 518. In response to the request, the seed S and the secret key $k_S$ is retrieved from memory 520 (e.g., the seed S is retrieved from standard memory such as RAM and the secret key $k_S$ is retrieved from secure memory), and the n-bit prime random number R is regenerated using the seed S and the secret key $k_S$ 522. Finally, the prime random number R is transmitted/provided to the application requesting the prime number(s) for key generation 524.

Figure 6:
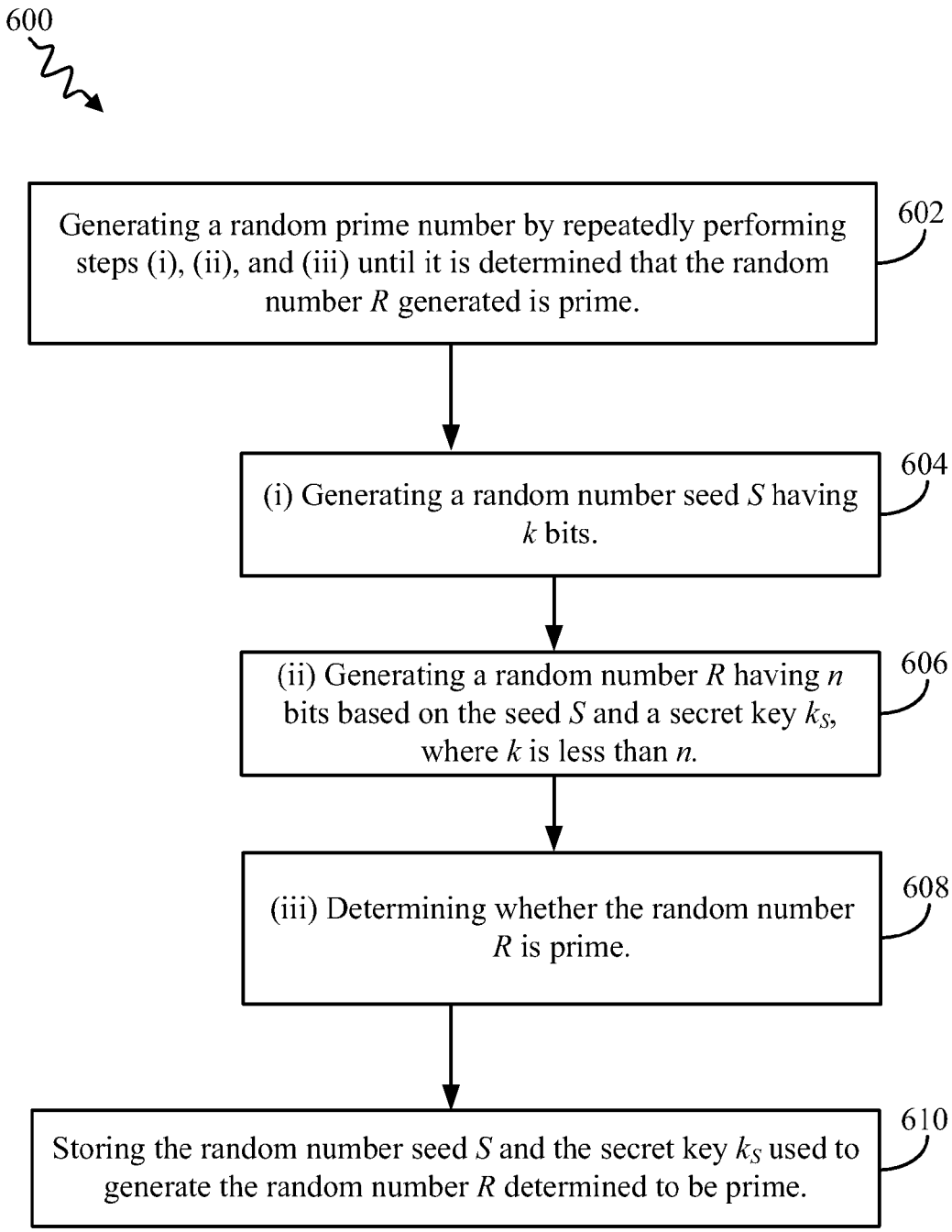
FIG. 6 illustrates a second example of a flow chart of a method for generating and storing seed values for prime number generation.

FIG. 6 illustrates a flow chart 600 of a method for generating and storing seed values for prime number generation according to one aspect. First, a random prime number is generated by repeatedly 602 generating a random number seed S having k bits 604, generating a random number R having n bits based on the seed S and a secret key $k_S$, where k is less than n 606, and determining whether the random number R is prime 608, until it is determined that the random number R generated is prime. Next, the random number seed S and the secret key $k_S$ used to generate the random number R determined to be prime is stored 610. The random number seed S may be stored in standard memory such as RAM whereas the secret key $k_S$ may be stored in secure memory such as OTP memory.

Figure 7A:
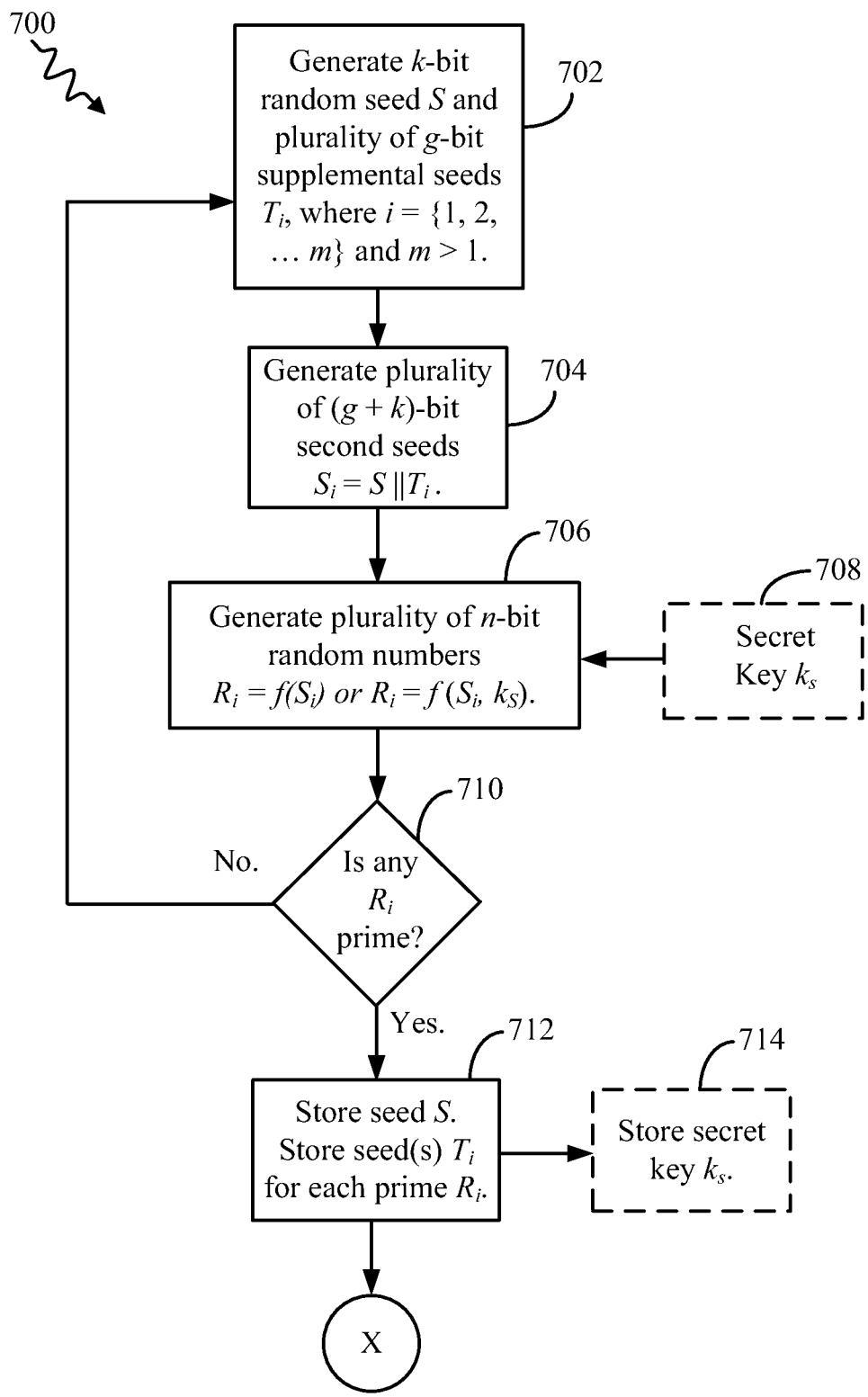
FIG. 7 (comprising FIGS. 7A and 7B) illustrates a fifth example of a flow diagram of a method for generating and storing seed values for prime number generation.
Figure 7B:
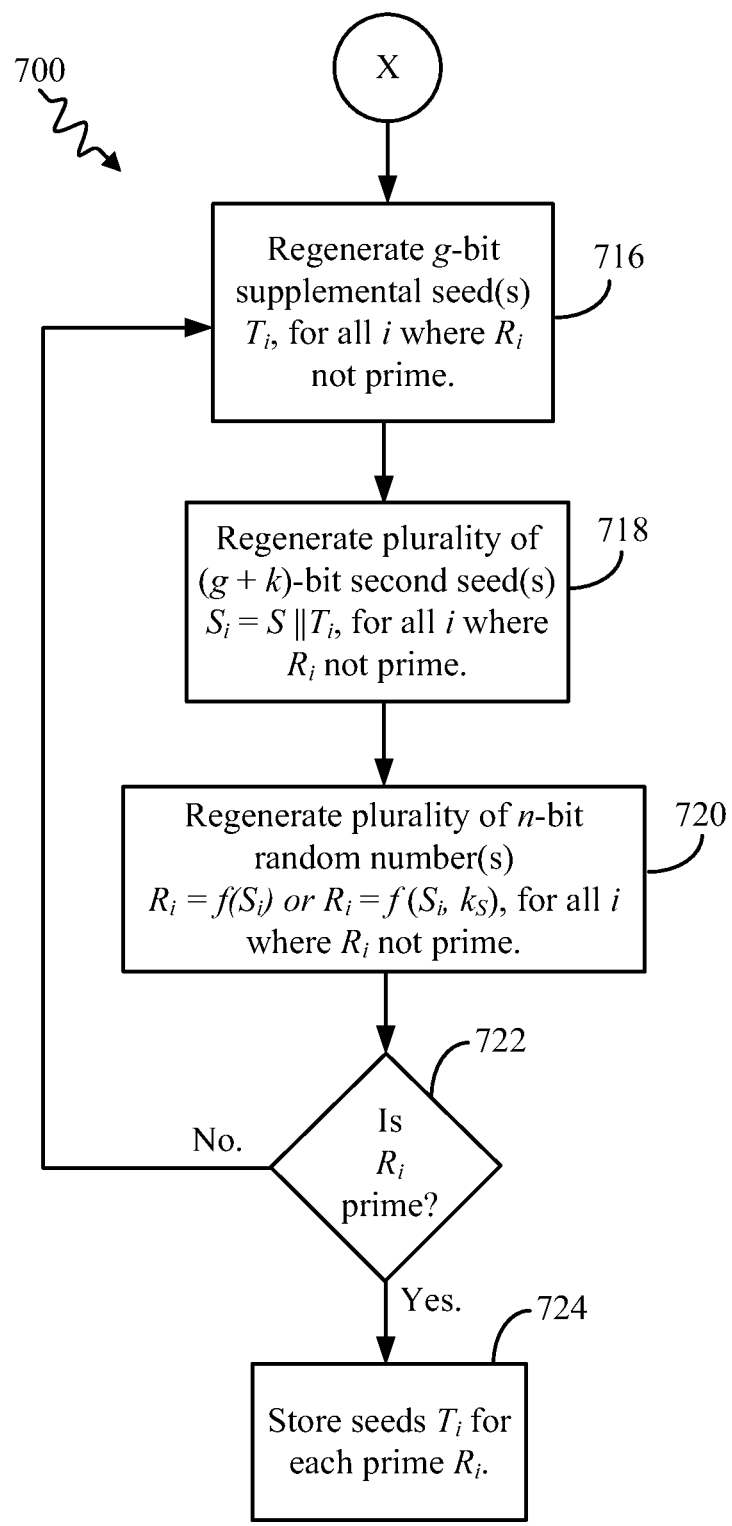

FIG. 7, which is comprised of FIGS. 7A and 7B, illustrates a flow diagram 700 of a method for generating and storing seed values for prime number generation according to one aspect. Referring to FIG. 7A, first, a k-bit random number seed S and a plurality of g-bit supplemental seeds $T_i$ are generated, where integer i={1, 2, . . . m}, and m>1 702.

The random number seed S and plurality of supplemental seeds $T_i$ may be generated using, for example, a random or pseudorandom number generator. The value k may be any integer number greater than or equal to two and the value g may be any integer number greater than or equal to one. According to one aspect, the g-bit supplemental seeds $T_i$ each have fewer bits than the k-bit random number seed S (i.e., g<k).

Next, a plurality of second seeds $S_i$ are generated based on the random number seed S and the plurality of supplemental seeds $T_i$. For example, the plurality of second seeds $S_i$ may be generated by concatenating the random number seed S with each of the plurality of supplemental seeds $T_i$ 704. Note that generation of the second seeds $S_i$ is not limited to concatenation of the random number seed S with the plurality of supplemental seeds $T_i$. Any logical operation(s) may be performed to generate the second seeds $S_i$ based on the random number seed S and the plurality of supplemental seeds $T_i$.

Then, a plurality of n-bit random numbers $R_i$ are generated based on the second seeds $S_i$, where n>k+g 706. According to one aspect, a one way function $f$ may be executed to generate the random numbers $R_i$ based on the second seeds $S_i$ according to the equation (3):

$$R_i = f(S_i), \text{ for integer values } i \geq 1 \quad (3).$$

According to another aspect, a one way function $f$ may be executed to generate the random numbers $R_i$ based on the second seeds $S_i$ and the secret key $k_S$ 708 according to the equation (4):

$$R_i = f(S_i, k_S), \text{ for integer values } i \geq 1 \quad (4).$$

In one example, the secret key $k_S$ may be known only to the apparatus performing the method 700. According to one aspect, the secret key $k_S$ may be retrieved from secure memory (e.g., read only memory, one-time programmable memory, that may or may not be encrypted) at the apparatus performing the method 700.

Next, a primality test is performed on each of the random numbers $R_i$ to determine whether any of the random numbers are prime 710. If any of the random numbers $R_i$ are determined to be prime, then the random number seed S and the one or more supplemental seeds $T_i$ used to generate the one or more random numbers $R_i$ determined to be prime are stored in memory 712. Optionally if a secret key $k_S$ was used by the one way function $f$ then the secret key $k_S$ is stored in secure memory 714. If none of the random numbers $R_i$ are prime then steps 702, 704, 706, 710 are repeated until at least one random number $R_i$ is determined to be prime.

Referring to FIG. 7B, after at least one random number $R_i$ is determined to be prime but not all random numbers $R_i$ are determined to be prime, one or more g-bit supplemental seeds $T_i$ are regenerated for all i where $R_i$ was determined not to be prime 716. Next, one or more second seeds $S_i$ are regenerated based on the random number seed S and the regenerated supplemental seeds $T_i$ for all i where $R_i$ was determined not to be prime 718. For example, the second seeds $S_i$ may be generated by concatenating the seed S with the supplemental seeds $T_i$. Then, one or more random numbers $R_i$ are regenerated based on the second seeds $S_i$ using a one way function $f$ for all i where $R_i$ was determined not to be prime 720. According to one example, the one-way function $f$ may receive a secret key $k_S$ as an input (see e.g., step 708).

Next, a primality test is performed on the regenerated random numbers $R_i$ 722. If a given random number $R_i$ is determined to be prime, then its corresponding supplemental seed $T_i$ that was used in part to regenerate the random number $R_i$ is stored 724. Otherwise if a random number $R_i$ is determined not to be prime then process steps 716, 718, 720, and 722 are repeated until all the random numbers $R_i$ regenerated are prime, and thus the corresponding supplemental seeds $T_i$ used to generate those random numbers $R_i$ are also stored 724. According to one aspect, the steps 716, 718, 720, 722 may stop being repeatedly performed after a threshold number of iterations in the event no prime numbers are left in the number space that includes the random number seed S.

An example is provided below to better illustrate the method 700 shown in FIGS. 7A and 7B. First, assume twenty prime numbers are desired by a given key generation process. Then, a single k-bit random seed S and twenty g-bit random supplemental seeds $T_1, T_2, \ldots T_{20}$ are generated 702. Next, twenty second seeds $S_1, S_2, \ldots S_{20}$ are generated based on the supplemental seeds $T_1, T_2, \ldots T_{20}$ 704, and in turn twenty random numbers $R_1, R_2, \ldots R_{20}$ are generated based on the second seeds $S_1, S_2, \ldots S_{20}$ using the function $f$ 706. Then, assume random numbers $R_2, R_7,$ and $R_{17}$ are determined to be prime and the remaining random numbers $R_1, R_3 \ldots R_6, R_8 \ldots R_{16}, R_{18}, R_{19}, R_{20}$ are determined not to be prime 710. Consequently the random number seed S and the supplemental seeds $T_2, T_7,$ and $T_{17}$ are stored in memory 712 (e.g., standard memory RAM).

Next, since random numbers $R_1, R_3 \ldots R_6, R_8 \ldots R_{16}, R_{18}, R_{19}, R_{20}$ were determined not to be prime, the supplemental seeds $T_1, T_3 \ldots T_6, T_{16}, T_{18}, T_{19}, T_{20}$ are regenerated (e.g., random new values) 716. Then, new second seeds $S_1, S_3 \ldots S_6, S_8 \ldots S_{16}, S_{18}, S_{19}, S_{20}$ are regenerated based on the newly regenerated supplemental seeds $T_1, T_3 \ldots T_6, T_8 \ldots T_{16}, T_{18}, T_{19}, T_{20}$ 718, and in turn, new random numbers $R_1, R_3 \ldots R_6, R_8 \ldots R_{16}, R_{18}, R_{19}, R_{20}$ are regenerated based on the newly regenerated second seeds $S_1, S_3 \ldots S_6, S_8 \ldots S_{16}, S_{18}, S_{19}, S_{20}$ 720. Next, a primality test is again executed on the newly regenerated random numbers $R_1, R_3 \ldots R_6, R_8 \ldots R_{16}, R_{18}, R_{19}, R_{20}$ to determine if they are prime 722. Assume this time it is determined that random numbers $R_1, R_6, R_{16},$ and $R_{18}$ are now prime, and thus the corresponding supplemental seeds $T_1, T_6, T_{16},$ and $T_{18}$ are saved in memory 724. Then, the steps 716, 718, 720, 722 are again repeated for the remaining random numbers that are still not prime until all twenty random numbers $R_1, R_2, \ldots R_{20}$ are determined to be prime.

Since the number of bits k of the random number seed S plus the number of bits g of the supplemental seed(s) $T_i$ is less than the number of bits n of the prime random number(s) $R_i$, memory space is saved by storing the seed S and the supplemental seed(s) $T_i$ instead of the random number(s) $R_i$, the latter of which may be discarded/deleted. Later, the random number seed S and the supplemental seed(s) $T_i$ may be retrieved from memory and used to regenerate the prime random number(s) $R_i$ using the one way function $f$. In cases where a secret key $k_S$ was also used by the function $f$ to generate the prime random number(s) $R_i$, the secret key $k_S$ is also retrieved from secure memory (in addition to the supplemental seeds $T_i$ and random number seed S) and used to regenerate the prime random number $R_i$ using the function $f$.

Thus, according to the method illustrated in FIGS. 7A and 7B, a plurality of prime, random numbers $R_i$ may be generated and then used with a cryptographic security algorithm, such as RSA, to generate a plurality of cryptographic security keys. The method illustrated in FIGS. 7A and 7B may be performed "offline" in that the random number seed S and the plurality of supplemental seeds $T_i$—known/proven to generate prime random numbers $R_i$—are generated and stored prior to receiving a request for one or more prime numbers from a key generation function.

Figure 8A:
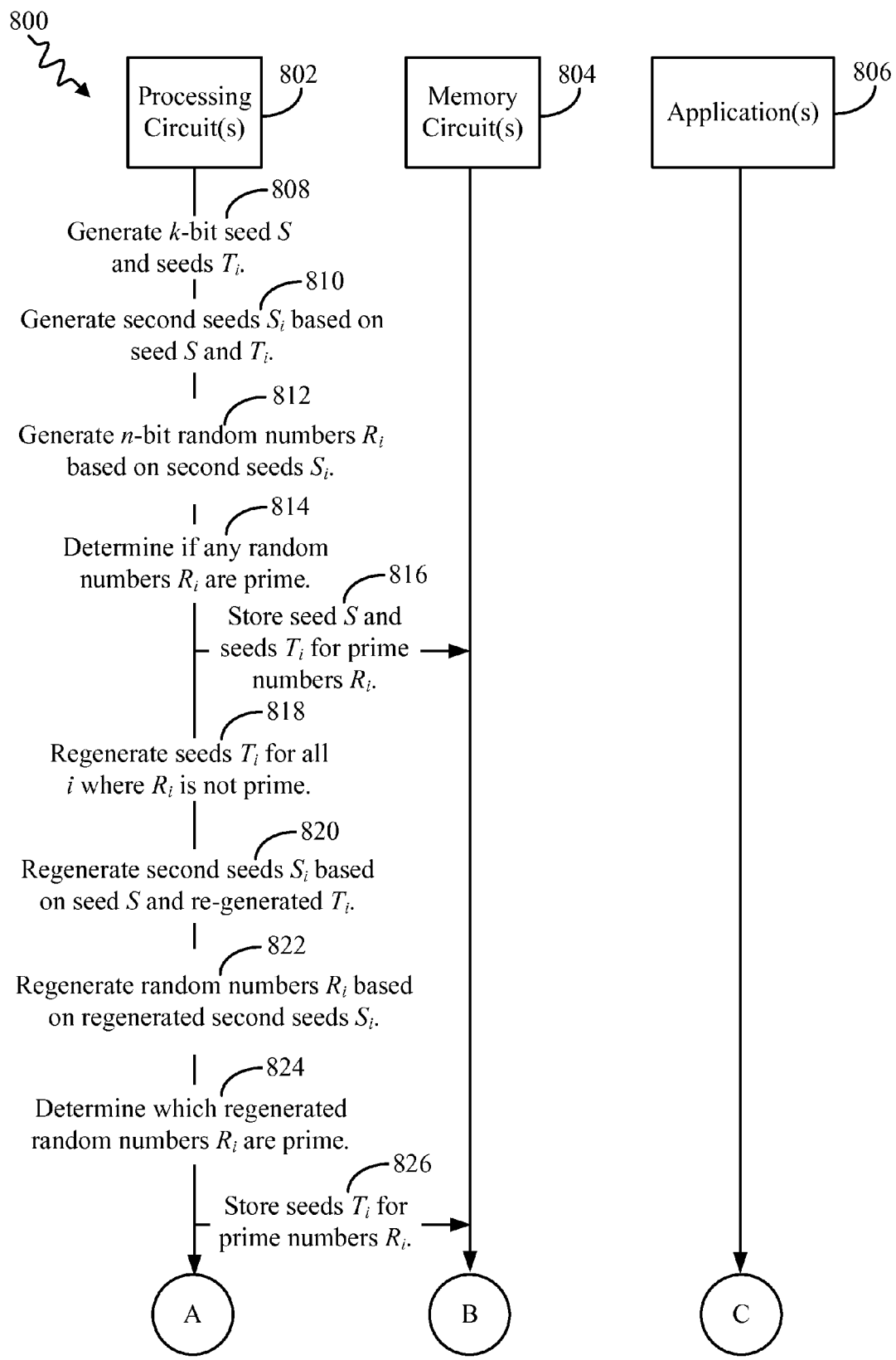
FIG. 8 (comprising FIGS. 8A and 8B) illustrates a flow diagram of a method for generating and storing seed values for prime number generation
Figure 8B:
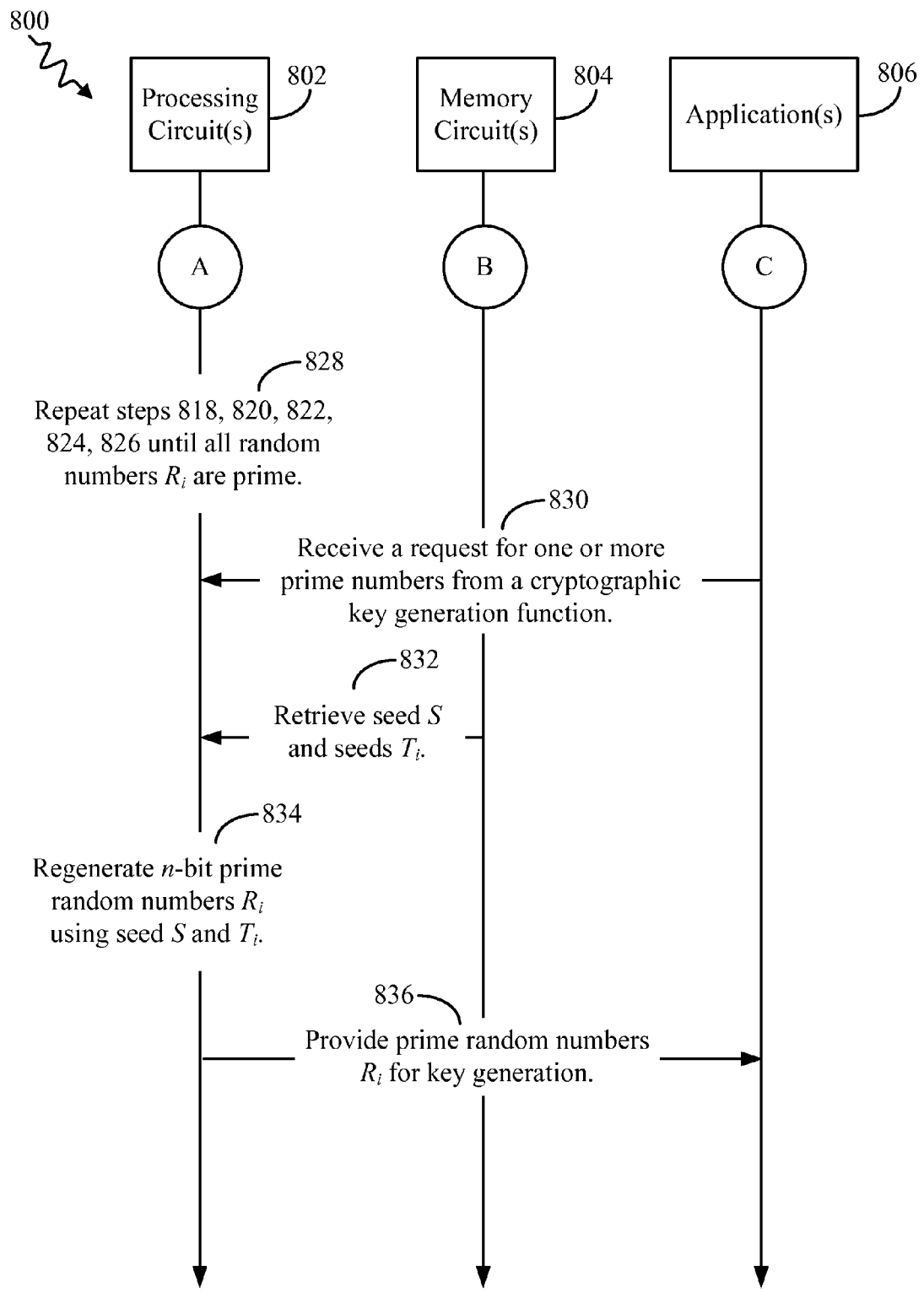

FIG. 8, which is comprised of FIGS. 8A and 8B, illustrates a flow diagram 800 of a method for generating and storing seed values for prime number generation according to one aspect. Referring to FIG. 8A, first, a k-bit random number seed S and a plurality of g-bit supplemental seeds $T_i$ are generated at a processing circuit 802 (e.g., processor) 808, where integer i={1, 2, . . . m}, and m>1. (Note that according to one aspect, the steps performed by the processing circuit 802 may be implemented in software.) Then, a plurality of (k+g)-bit second seeds $S_i$ are generated based on the seed S and the plurality of supplemental seeds $T_i$ (e.g., concatenating seed S with the plurality of supplemental seeds $T_i$) 810. Next, a plurality of n-bit random numbers $R_i$ are generated based on the second seeds $S_i$ (e.g., using the one way function $f$ described above with respect to FIGS. 7A and 7B) 812, where n>g+k. Then, it is determined whether any of the random numbers $R_i$ generated are prime 814. Steps 808, 810, 812, 814 are repeated until at least one random number $R_i$ is determined to be prime. Assuming at least one or more random numbers $R_i$ are determined to be prime, the seed S and the supplemental seed(s) $T_i$ used to generate the prime random number(s) $R_i$ are stored at a memory circuit 804 (e.g., memory) 816.

Next, the supplemental seeds $T_i$ associated with those random numbers $R_i$ that were determined not to be prime are regenerated 818. Then, new second seeds $S_i$ are regenerated based on the regenerated supplemental seeds $T_i$ 820, and in turn, new random numbers $R_i$ are regenerated based on the regenerated second seeds $S_i$ 822. Next, primality tests are executed on the regenerated random numbers $R_i$ to determine if they are prime 824. The supplemental seeds $T_i$ associated with random numbers $R_i$ determined to be prime are stored 826 in memory circuit 804. Referring to FIG. 8B, process steps 818, 820, 822, 824, 826 are repeated until all the regenerated random numbers $R_i$ are determined to be prime 828, and thus their associated supplemental seeds $T_i$ are also stored in the memory circuit 804. The random numbers $R_i$ determined to be prime may be discarded or deleted at this point since the seeds S and the associated supplemental seeds $T_i$ have been stored, and can be used to regenerate the prime numbers $R_1$.

Next, a request for one or more prime numbers is received from an application 806 that implements a cryptographic key generation function 830. In response to the request, the seed S and the supplemental seeds $T_i$ are retrieved 832 from memory 804, and the n-bit prime random numbers $R_i$ are regenerated using the seed S and the supplemental seeds $T_i$ 834. If a secret key $k_S$ was used by the one way function $f$ that generated the random numbers $R_i$ based on the second seeds $S_i$, then the secret key $k_S$ is also retrieved from memory (e.g., secure memory) in order to regenerate the prime random numbers $R_1$. Finally, the prime random numbers $R_i$ are transmitted/provided to the application 806 requesting the prime number(s) for key generation 836.

Figure 9:
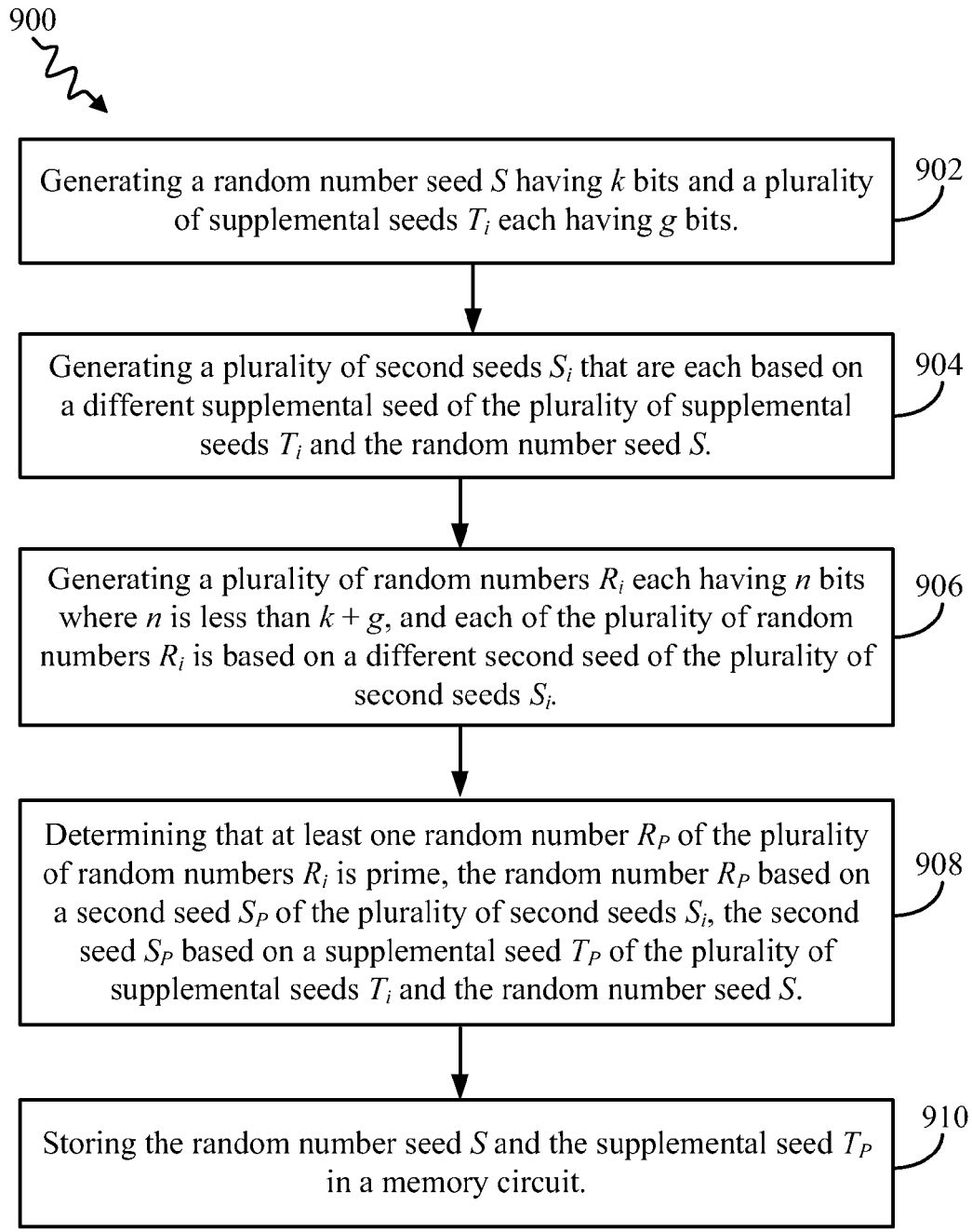
FIG. 9 illustrates a flow chart of a method for generating and storing seed values for prime number generation

FIG. 9 illustrates a flow chart 900 of a method for generating and storing seed values for prime number generation according to one aspect. First, a random number seed S having k bits and a plurality of supplemental seeds $T_i$ each having g bits are generated 902. Next, a plurality of second seeds $S_i$ are generated that are each based on a different supplemental seed of the plurality of supplemental seeds $T_i$ and the random number seed S 904. Then, a plurality of random numbers $R_i$ each having n bits where n is less than k+g is generated, and each of the plurality of random numbers $R_i$ is based on a different second seed of the plurality of second seeds $S_i$ 906. Next, it is determined that at least one random number $R_P$ of the plurality of random numbers $R_i$ is prime, where the random number $R_P$ is based on a second seed $S_P$ of the plurality of second seeds $S_i$, and the second seed $S_P$ is based on a supplemental seed $T_P$ of the plurality of supplemental seeds $T_i$ and the random number seed S 908. Then, the random number seed S and the supplemental seed $T_P$ is stored in a memory circuit 910.

According to one aspect of the disclosure, the stored random number seed S and the supplemental seed $T_P$ from the memory circuit may be retrieved, and the prime random number $R_P$ may be regenerated based on the random number seed S and the supplemental seed $T_P$. According to another aspect, the random number seed S and the supplemental seed $T_P$ may be stored prior to receiving a request for one or more prime numbers from a cryptographic key generation process. Then, a request for one or more prime numbers from the cryptographic key generation process may be received. In response, a cryptographic key may be generated based on the prime random number $R_P$. The cryptographic key may then be provided to the cryptographic key generation process.

According to one aspect, generating the plurality of random numbers $R_i$ based on the different second seeds of the plurality of second seeds $S_i$ may include executing a one way function $f$ that receives each of the plurality of second seeds $S_i$ as inputs and generates the plurality of random numbers $R_i$ as outputs, and the one way function $f$ is at least one of a secure hash function and/or a block cipher. According to another aspect, it may be determined that at least one random number of the plurality of random numbers $R_i$ is not prime. Then, another supplemental seed $T_2$ having g bits may be generated, another second seed $S_2$ based on the supplemental seed $T_2$ and the random number seed S may be generated, and another random number $R_2$ having n bits may be generated based on the second seed $S_2$. It may next be determined that the random number $R_2$ is prime, and consequently, the supplemental seed $T_2$ may be stored in the memory circuit.

According to one aspect, the stored random number seed S and the supplemental seed $T_2$ may be retrieved from a memory circuit, and the prime random number $R_2$ may be regenerated based on the random number seed S and the supplemental seed $T_2$. According to another aspect, a request for a predetermined number of prime numbers may be received. In response, the following steps may be repeated until a number of supplemental seeds each associated with different prime numbers have been stored equal to the predetermined number: generating another supplemental seed $T_2$; generating another second seed $S_2$ based on the supplemental seed $T_2$ and the random number seed S; generating another random number $R_2$ having n bits based on the second seed $S_2$; determining that the random number $R_2$ is prime; and storing the supplemental seed $T_2$ in the memory circuit.

Exemplary Electronic Device

Figure 10:
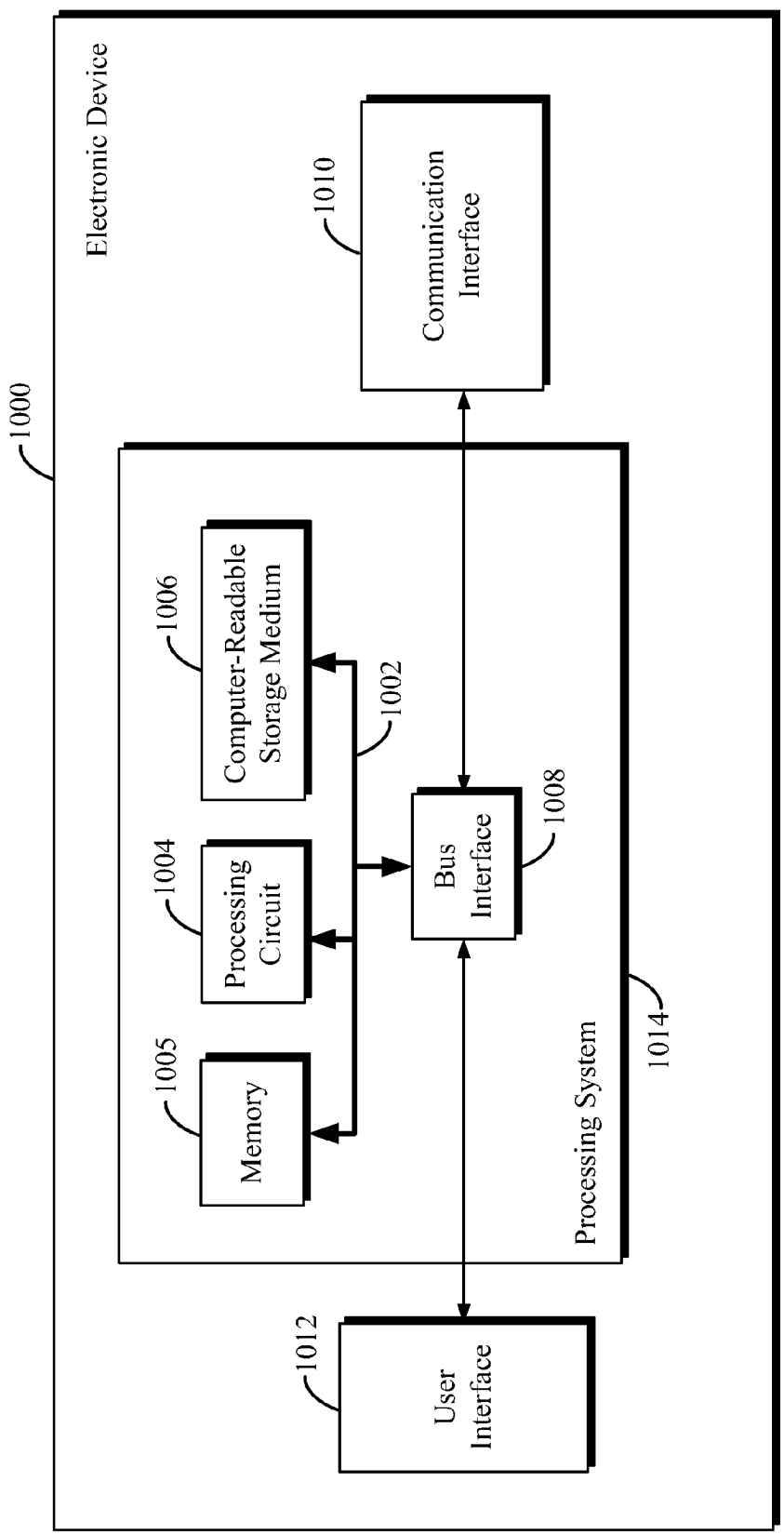
FIG. 10 illustrates an exemplary schematic block diagram of a hardware implementation for an electronic device that executes any of the methods for cryptographic security described herein.

FIG. 10 illustrates an exemplary schematic block diagram of a hardware implementation for an electronic device 1000 that executes any of the methods for cryptographic security described herein. The electronic device 1000 may be a mobile phone, smartphone, tablet, portable computer, and or any other electronic device having circuitry. The electronic device 1000 may include a communication interface 1010, a user interface 1012, and a processing system 1014. The processing system 1014 may include a processing circuit (e.g., processor) 1004, a memory circuit (e.g., memory) 1005, a computer-readable storage medium 1006, a bus interface 1008, and a bus 1002. The processing system 1014 and/or the processing circuit 1004 may be configured to perform any of the steps, functions, and/or processes described with respect to FIGS. 1, 2, 3, 4, 5, 6, 7A, 7B, 8A, 8B, and/or 9.

The processing circuit 1004 may be one or more processors (e.g., first processor, etc.) that are adapted to process data for the electronic device 1000. For example, the processing circuit 1004 may be a specialized processor, such as an application specific integrated circuit (ASIC) that serves as a means for carrying out any one of the steps described in FIGS. 1, 2, 3, 4, 5, 6, 7A, 7B, 8A, 8B, and/or 9.

Examples of processing circuits 1004 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. The processing circuit 1004 is also responsible for managing the bus 1002, and executing software stored on the computer-readable storage medium 1006 and/or memory 1005. The software, when executed by the processing circuit 1004, causes the processing system 1014 to perform the various functions, steps, and/or processes described above with respect to FIGS. 1, 2, 3, 4, 5, 6, 7A, 7B, 8A, 8B, and/or 9. The computer-readable storage medium 1006 may be used for storing data that is manipulated by the processing circuit 1004 when executing software.

The memory circuit 1005 may be non-volatile memory, such as but not limited to FLASH memory, magnetic or optical hard disk drives, etc. In some aspects, the memory storing the sector information and/or overhead messages (including configuration sequence number) may be volatile memory, such as DRAM (e.g., DDR SDRAM), SRAM, etc. that may be continuously powered so as to store the information indefinitely. The memory circuit 1005 serves as one example of a means for storing random number seed S, a means for storing supplemental seeds $T_i$, and when secured, a means for storing secret key $k_S$.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable storage medium 1006. The computer-readable storage medium 1006 may be a non-transitory computer-readable storage medium. A non-transitory computer-readable storage medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable storage medium may also include, by way of example, a carrier wave, a transmission line, and any other suitable medium for transmitting software and/or instructions that may be accessed and read by a computer. The computer-readable storage medium 1006 may reside in the processing system 1014, external to the processing system 1014, or distributed across multiple entities including the processing system 1014. The computer-readable storage medium 1006 may be embodied in a computer program product.

In this example, the processing system 1014 may be implemented with a bus architecture, represented generally by the bus 1002. The bus 1002 may include any number of interconnecting buses and bridges depending on the specific application of the processing system 1014 and the overall design constraints. The bus 1002 links together various circuits including one or more processors (represented generally by the processor 1004), a memory 1005, and computer-readable media (represented generally by the computer-readable storage medium 1006). The bus 1002 may also link various other circuits such as timing sources, peripherals, voltage regulators, and power management circuits, which are well known in the art, and therefore, will not be described any further. A bus interface 1008 provides an interface between the bus 1002 and the communication interface 1010 (if present). The communication interface 1010 provides a means for communicating with other apparatus over a transmission medium. Depending upon the nature of the apparatus, a user interface 1012 (e.g., keypad, display, speaker, microphone, touchscreen display, etc.) may also be provided for the electronic device 1000.

Figure 11:
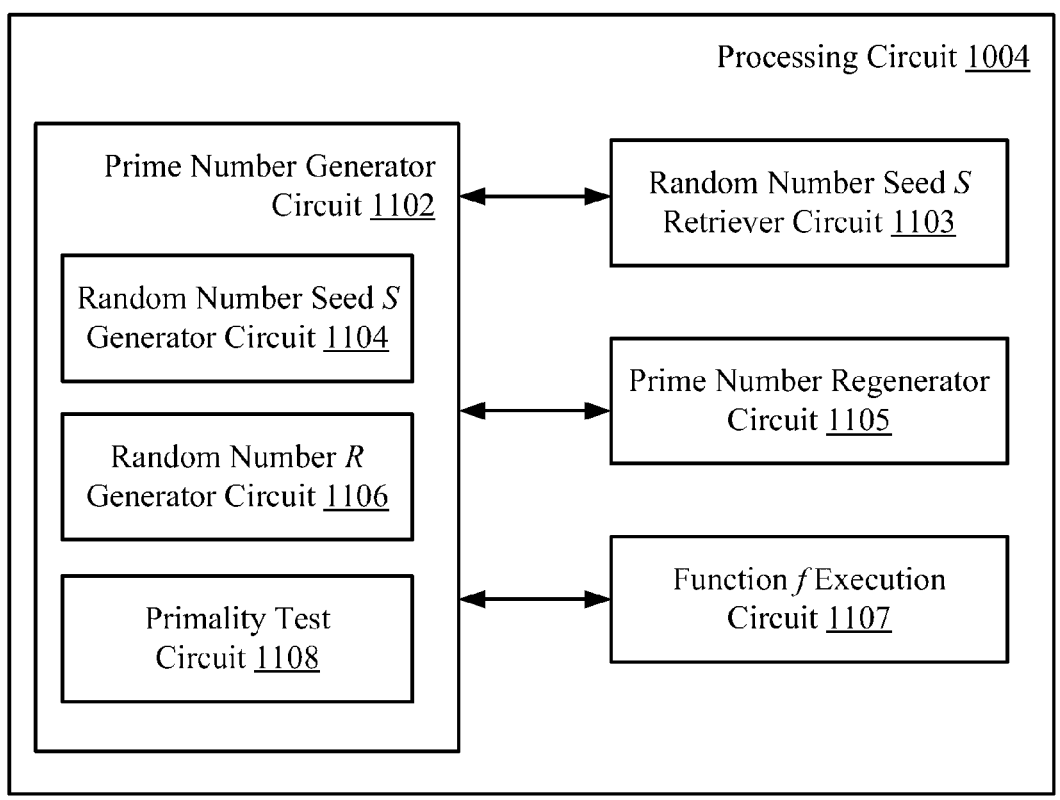
FIG. 11 illustrates a schematic block diagram of the processing circuit.

FIG. 11 illustrates a schematic block diagram of the processing circuit 1004 according to one aspect. The processing circuit 1004 may include a prime number generator circuit 1102, random number seed S retriever circuit 1103, prime number regenerator circuit 1105, and a function $f$ execution circuit 1107. The prime number generator circuit 1102 may include a random number seed S generator circuit 1104, a random number R generator circuit 1106, and a primality test circuit 1108.

The prime number generator circuit 1102 serves as one example of a means for generating a prime number by repeatedly generating a random number seed S having k bits, generating a random number R having n bits based on the seed S, and determining whether the random number R is prime. Specifically, the random number seed S generator circuit 1104 serves as one example of a means for generating random number seed S, the random number R generator circuit 1106 serves as one example of a means for generating a random number R having n bits based on the seed S, and the primality test circuit 1108 serves as one example of a means for determining whether the random number R is prime.

The random number seed S retriever circuit 1103 serves as one example of a means for retrieving random number seed S from the memory circuit 1005. The prime number regenerator circuit 1105 serves as one example of a means for regenerating a prime number based on the random number seed S. The function $f$ execution circuit 1107 serves as one example of a means for executing a one way function $f$ that receives the seed S as an input and generates the random number R as an output.

Figure 12:
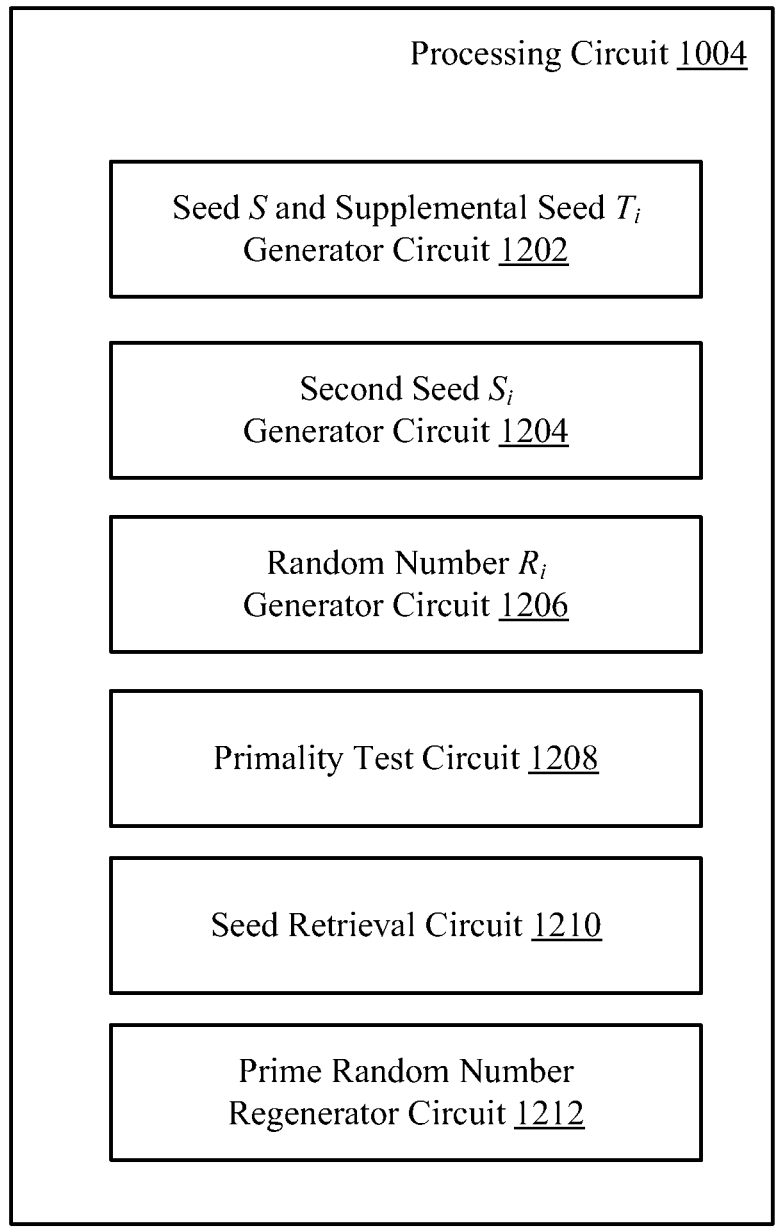
FIG. 12 illustrates a schematic block diagram of the processing circuit.

FIG. 12 illustrates a schematic block diagram of the processing circuit 1004 according to one aspect. The processing circuit 1004 may include a seed S and supplemental seed $T_i$ generator circuit 1202, a second seed $S_i$ generator circuit 1204, a random number $R_i$ generator circuit 1206, a primality test circuit 1208, a seed retrieval circuit 1210, and a prime random number regenerator circuit 1212.

The seed S and supplemental seed $T_i$ generator circuit 1202 serves as one example of a means for generating a random number seed S and supplemental seeds $T_i$. The second seed $S_i$ generator circuit 1204 serves as one example of a means for generating second seeds $S_i$ that are each based on a different supplemental seed of a plurality of supplemental seeds $T_i$ and the random number seed S. The random number $R_i$ generator circuit 1206 serves as one example of a means for generating a plurality of random numbers $R_i$ each having n bits that are each based on a different second seed of the plurality of second seeds $S_i$. The primality test circuit 1208 serves as one example of a means for determining whether the random number $R_P$ is prime. The seed retrieval circuit 1210 serves as one example of a means for retrieving the random number seed S and a plurality of supplemental seeds $T_i$ (e.g., seed $T_P$). The prime random number regenerator circuit 1212 serves as one example of a means for regenerating prime random number (e.g., prime random number $R_P$) based on the random number seed S and supplemental seeds $T_i$ (e.g., supplemental seed $T_P$).

The methods and devices described herein may be used to generate and store seed values for prime number generation for any use not limited to cryptographic security and/or cryptographic key generation.

One or more of the components, steps, features, and/or functions illustrated in FIGS. 1, 2, 3, 4, 5, 6, 7A, 7B, 8A, 8B, 9, 10, 11, and/or 12 may be rearranged and/or combined into a single component, step, feature or function or embodied in several components, steps, or functions. Additional elements, components, steps, and/or functions may also be added without departing from the invention. The apparatus, devices, and/or components illustrated in FIGS. 10, 11, and/or 12 may be configured to perform one or more of the methods, features, or steps described in FIGS. 1, 2, 3, 4, 5, 6, 7A, 7B, 8A, 8B, and/or 9. The algorithms described herein may also be efficiently implemented in software and/or embedded in hardware.

Moreover, in one aspect of the disclosure, the processing circuit 1004 illustrated in FIGS. 10, 11, and/or 12 may be a specialized processor (e.g., an application specific integrated circuit (e.g., ASIC)) that is specifically designed and/or hard-wired to perform the algorithms, methods, and/or steps described in FIGS. 1, 2, 3, 4, 5, 6, 7A, 7B, 8A, 8B, and/or 9. Thus, such a specialized processor (e.g., ASIC) may be one example of a means for executing the algorithms, methods, and/or steps described in FIGS. 1, 2, 3, 4, 5, 6, 7A, 7B, 8A, 8B, and/or 9. The computer-readable storage medium 1006 may also store processor 1004 readable instructions that when executed by a specialized processor (e.g., ASIC) causes the specialized processor to perform the algorithms, methods, and/or steps described in FIGS. 1, 2, 3, 4, 5, 6, 7A, 7B, 8A, 8B, and/or 9.

Also, it is noted that the aspects of the present disclosure may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums and, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

Furthermore, aspects of the disclosure may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing aspects of the disclosure are merely examples and are not to be construed as limiting the invention. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. A method comprising:
generating, at a processing circuit, a prime number by repeatedly
generating a random number seed S having k bits,
generating a random number R having n bits based on the seed S, where k is less than (n−1), by inputting the seed S to a one-way function circuit implementing a one-way function $f$ to obtain the random number R as an output of the one-way function circuit, and
determining whether the random number R is prime,
until it is determined that the random number R generated is prime;
storing, in a memory circuit, the random number seed S having less bits than the random number R determined to be prime, wherein storing the random number seed S requires less memory space than storing the random number R determined to be prime;
retrieving the stored random number seed S from the memory circuit; and
generating the random number R determined to be prime using the retrieved random number seed S.

2. The method of claim 1, further comprising:
generating a cryptographic key based on the random number R determined to be prime.

3. The method of claim 1, further comprising:
deleting the random number R from a memory circuit after storing the seed S.

4. The method of claim 1, wherein generating the random number R is further based on a secret key $k_S$.

5. The method of claim 4, further comprising:
storing the secret key $k_S$ used to generate the random number R determined to be prime in a secure memory circuit.

6. The method of claim 1, wherein the random number seed S is stored prior to receiving a request for one or more prime numbers from a cryptographic key generation process.

7. The method of claim 1, wherein the one way function $f$ is at least one of a secure hash function and/or a block cipher.

8. An apparatus comprising:
a one-way function circuit adapted to implement a one-way function $f$ the one-way function circuit adapted to receive a value having k bits as an input and generate a value having n bits as an output, where n>k+1;
a memory circuit; and
a processing circuit communicatively coupled to the memory circuit, the processing circuit configured to:
generate a prime number by repeatedly
generating a random number seed S having k bits,
generating a random number R having n bits based on the seed S, where k is less than (n−1), by inputting the seed S to the one-way function circuit and obtaining the random number R as an output of the one-way function circuit, and determining whether the random number R is prime, until it is determined that the random number R generated is prime;

store, in the memory circuit, the random number seed S having less bits than the random number R determined to be prime, wherein storing the random number seed S requires less memory space than storing the random number R determined to be prime;

retrieve the stored random number seed S from the memory circuit and generate the random number R determined to be prime using the retrieved random number seed S.

9. The apparatus of claim 8, wherein the processing circuit is further configured to:

generate a cryptographic key based on the random number R determined to be prime.

10. The apparatus of claim 8, wherein the random number seed S is stored prior to receiving a request for one or more prime numbers from a cryptographic key generation process.

11. The apparatus of claim 8, wherein generating the random number R determined to be prime is further based on a secret key $k_S$, and the processing circuit is further configured to store the secret key $k_S$ in a secure memory circuit.

12. An apparatus comprising:

means for generating a prime number by repeatedly generating a random number seed S having k bits, generating a random number R having n bits based on the seed S, where k is less than (n−1), by inputting the seed S to a one-way function circuit implementing a one-way function $f$ to obtain the random number R as an output of the one-way function circuit, and determining whether the random number R is prime, until it is determined that the random number R generated is prime;

means for storing the random number seed S having less bits than the random number R determined to be prime, wherein storing the random number seed S requires less memory space than storing the random number R determined to be prime;

means for retrieving the stored random number seed S from the means for storing; and generating the random number R determined to be prime using the retrieved random number seed S.

13. The apparatus of claim 12, wherein the random number seed S is stored prior to receiving a request for one or more prime numbers from a cryptographic key generation process.

14. The apparatus of claim 12, wherein generating the random number R determined to be prime is further based on a secret key $k_S$, and the apparatus further comprises means for storing the secret key $k_S$ in a secure memory circuit.

15. A non-transitory computer-readable storage medium having one or more instructions stored thereon, which when executed by at least one processor causes the processor to:

generate a prime number by repeatedly generating a random number seed S having k bits, generating a random number R having n bits based on the seed S, where k is less than (n−1), by inputting the seed S to a one-way function circuit implementing a one-way function $f$ to obtain the random number R as an output of the one-way function circuit, and determining whether the random number R is prime, until it is determined that the random number R generated is prime;

store, in a memory circuit, the random number seed S having less bits than the random number R determined to be prime, wherein storing the random number seed S requires less memory space than storing the random number R determined to be prime;

retrieve the stored random number seed S from the memory circuit; and generate the random number R determined to be prime using the retrieved random number seed S.

16. A method comprising:

generating a random number seed S having k bits and a plurality of supplemental seeds $T_i$ each having g bits;

generating a plurality of second seeds $S_i$ that are each based on a different supplemental seed of the plurality of supplemental seeds $T_i$ and the random number seed S;

generating a plurality of random numbers $R_i$ by inputting the plurality of second seeds $S_i$ to a one-way function circuit implementing a one-way function $f$ to obtain the plurality of random numbers $R_i$ as an output of the one-way function circuit, wherein each of the plurality of random numbers $R_i$ have n bits where n is greater than k +g;

determining that at least one random number $R_P$ of the plurality of random numbers $R_i$ is prime, the random number $R_P$ based on a second seed $S_P$ of the plurality of second seeds $S_i$ the second seed $S_P$ based on a supplemental seed $T_P$ of the plurality of supplemental seeds $T_i$ and the random number seed S; and storing, in a memory circuit, the random number seed S and the supplemental seed $T_P$ that together have less bits than the random number $R_P$, and using the random number seed S and the supplemental seed $T_P$ to generate the random number $R_P$ determined to be prime, wherein storing the random number seed S and supplemental seed $T_P$ requires less memory space than storing the random number $R_P$.

17. The method of claim 16, wherein the plurality of random numbers $R_i$ is further based on a secret key $k_S$, and the method further comprises storing the secret key $k_S$ in a secure memory circuit.

18. The method of claim 16, further comprising:

retrieving the stored random number seed S and the supplemental seed $T_P$ from the memory circuit; and regenerating the prime random number $R_P$ based on the random number seed S and the supplemental seed $T_P$.

19. The method of claim 18, wherein the random number seed S and the supplemental seed $T_P$ is stored prior to receiving a request for one or more prime numbers from a cryptographic key generation process, and the method further comprises:

receiving the request for one or more prime numbers from the cryptographic key generation process;

generating a cryptographic key based on the prime random number $R_P$; and providing the cryptographic key to the cryptographic key generation process.

20. The method of claim 16, wherein the one way function $f$ is at least one of a secure hash function and/or a block cipher.

21. The method of claim 16, further comprising:

determining that at least one random number of the plurality of random numbers $R_i$ is not prime;

generating another supplemental seed $T_2$ having g bits;

generating another second seed $S_2$ based on the supplemental seed $T_2$ and the random number seed S;

generating another random number $R_2$ having n bits, the random number $R_2$ based on the second seed $S_2$;

determining that the random number $R_2$ is prime; and storing the supplemental seed $T_2$ in the memory circuit.

22. The method of claim 21, further comprising:

retrieving the stored random number seed S and the supplemental seed $T_2$ from the memory circuit; and regenerating the prime random number $R_2$ based on the random number seed S and the supplemental seed $T_2$.

23. The method of claim 21, further comprising:

receiving a request for a predetermined number of prime numbers; and repeating the method steps of generating another supplemental seed $T_2$, generating another second seed $S_2$ based on the supplemental seed $T_2$ and the random number seed S, generating another random number $R_2$ having n bits, the random number $R_2$ based on the second seed $S_2$, determining that the random number $R_2$ is prime, and storing the supplemental seed $T_2$ in the memory circuit, until a number of supplemental seeds each associated with different prime numbers have been stored equal to the predetermined number.

24. An apparatus comprising:

a one-way function circuit adapted to implement a one-way function $f$;

a memory circuit; and a processing circuit communicatively coupled to the memory circuit, the processing circuit configured to generate a random number seed S having k bits and a plurality of supplemental seeds $T_i$ each having g bits, generate a plurality of second seeds $S_i$ that are each based on a different supplemental seed of the plurality of supplemental seeds $T_i$ and the random number seed S, generate a plurality of random numbers $R_i$ by inputting the plurality of second seeds $S_i$ to the one-way function circuit to obtain the plurality of random numbers $R_i$ as an output of the one-way function circuit, wherein each of the plurality of random numbers $R_i$ have n bits where n is greater than k +g, determine that at least one random number $R_P$ of the plurality of random numbers $R_i$ is prime, the random number $R_P$ based on a second seed $S_P$ of the plurality of second seeds $S_i$, the second seed $S_P$ based on a supplemental seed $T_P$ of the plurality of supplemental seeds $T_i$ and the random number seed S, and store, in a memory circuit, the random number seed S and the supplemental seed $T_P$ that together have less bits than the random number $R_P$, and use the random number seed S and the supplemental seed $T_P$ to generate the random number $R_P$ determined to be prime, wherein storing the random number seed S and supplemental seed $T_P$ requires less memory space than storing the random number $R_P$.

25. The apparatus of claim 24, wherein the plurality of random numbers $R_i$ is further based on a secret key $k_S$, and the processing circuit is further configured to store the secret key $k_S$ in a secure memory circuit.

26. The apparatus of claim 24, wherein the processing circuit is further configured to:

retrieve the stored random number seed S and the supplemental seed $T_P$ from the memory circuit; and regenerate the prime random number $R_P$ based on the random number seed S and the supplemental seed $T_P$.

27. The apparatus of claim 26, wherein the random number seed S and the supplemental seed $T_P$ is stored prior to receiving a request for one or more prime numbers from a cryptographic key generation process, and the processing circuit is further configured to:

receive the request for one or more prime numbers from the cryptographic key generation process;

generate a cryptographic key based on the prime random number $R_P$; and provide the cryptographic key to the cryptographic key generation process.

28. The apparatus of claim 24, wherein the one way function $f$ is at least one of a secure hash function and/or a block cipher.

29. The apparatus of claim 24, wherein the processing circuit is further configured to:

determine that at least one random number of the plurality of random numbers $R_i$ is not prime;

generate another supplemental seed $T_2$ having g bits;

generate another second seed $S_2$ based on the supplemental seed $T_2$ and the random number seed S;

generate another random number $R_2$ having n bits, the random number $R_2$ based on the second seed $S_2$;

determine that the random number $R_2$ is prime; and store the supplemental seed $T_2$ in the memory circuit.

30. The apparatus of claim 29, wherein the processing circuit is further configured to:

retrieve the stored random number seed S and the supplemental seed $T_2$ from the memory circuit; and regenerate the prime random number $R_2$ based on the random number seed S and the supplemental seed $T_2$.

31. An apparatus comprising:

means for generating a random number seed S having k bits and a plurality of supplemental seeds $T_i$ each having g bits;

means for generating a plurality of second seeds $S_i$ that are each based on a different supplemental seed of the plurality of supplemental seeds $T_i$ and the random number seed S;

means for generating a plurality of random numbers $R_i$ by inputting the plurality of second seeds $S_i$ to a one-way function circuit implementing a one-way function $f$ to obtain the plurality of random numbers $R_i$ as an output of the one-way function circuit, wherein each of the plurality of random numbers $R_i$ have n bits where n is greater than k +g;

means for determining that at least one random number $R_P$ of the plurality of random numbers $R_i$ is prime, the random number $R_P$ based on a second seed $S_P$ of the plurality of second seeds $S_i$, the second seed $S_P$ based on a supplemental seed $T_P$ of the plurality of supplemental seeds $T_i$ and the random number seed S; and means for storing the random number seed S and the supplemental seed $T_P$ that together have less bits than the random number $R_P$, and using the random number seed S and the supplemental seed $T_P$ to generate the random number $R_P$ determined to be prime, wherein storing the random number seed S and supplemental seed $T_P$ requires less memory space than storing the random number $R_P$.

32. The apparatus of claim 31, further comprising:

means for retrieving the stored random number seed S and the supplemental seed $T_P$ from the memory circuit; and means for regenerating the prime random number $R_P$ based on the random number seed S and the supplemental seed $T_P$.

33. A non-transitory computer-readable storage medium having one or more instructions stored thereon, which when executed by at least one processor causes the processor to:
generate a random number seed S having k bits and a plurality of supplemental seeds $T_i$ each having g bits;
generate a plurality of second seeds $S_i$ that are each based on a different supplemental seed of the plurality of supplemental seeds $T_i$ and the random number seed S;
generate a plurality of random numbers $R_i$ by inputting the plurality of second seeds $S_i$ to a one-way function circuit implementing a one-way function $f$ to obtain the plurality of random numbers $R_i$ as an output of the one-way function circuit, wherein each of the plurality of random numbers $R_i$ have n bits where n is greater than k +g;
determine that at least one random number $R_P$ of the plurality of random numbers $R_i$ is prime, the random number $R_P$ based on a second seed $S_P$ of the plurality of second seeds $S_i$, the second seed $S_P$ based on a supplemental seed $T_P$ of the plurality of supplemental seeds $T_i$ and the random number seed S; and
store, in a memory circuit, the random number seed S and the supplemental seed $T_P$ that together have less bits than the random number $R_P$, and use the random number seed S and the supplemental seed $T_P$ to generate the random number $R_P$ determined to be prime, wherein storing the random number seed S and supplemental seed $T_P$ requires less memory space than storing the random number $R_P$.

34. The non-transitory computer-readable storage medium of claim 33, wherein the instructions further cause the processor to:
retrieve the stored random number seed S and the supplemental seed $T_P$ from the memory circuit; and
regenerate the prime random number $R_P$ based on the random number seed S and the supplemental seed $T_P$.

* * * * *